(12) United States Patent
Faulkner et al.

(10) Patent No.: US 10,511,643 B2
(45) Date of Patent: Dec. 17, 2019

(54) MANAGING USER IMMERSION LEVELS AND NOTIFICATIONS OF CONFERENCE ACTIVITIES

(71) Applicant: MICROSOFT TECHNOLOGY LICENSING, LLC, Redmond, WA (US)

(72) Inventors: Jason Thomas Faulkner, Seattle, WA (US); Mark Robert Swift, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 264 days.

(21) Appl. No.: 15/599,422

(22) Filed: May 18, 2017

(65) Prior Publication Data

US 2018/0337963 A1 Nov. 22, 2018

(51) Int. Cl.
*H04L 29/06* (2006.01)
*H04L 29/08* (2006.01)

(52) U.S. Cl.
CPC ........ *H04L 65/403* (2013.01); *H04L 65/4015* (2013.01); *H04L 67/26* (2013.01); *H04L 67/306* (2013.01)

(58) Field of Classification Search
CPC . H04L 65/00; H04L 65/1066; H04L 65/1096; H04L 65/40–4015; H04L 29/06476–06503; H04L 29/06387–06401; H04L 65/60–607; H04L 65/403; H04L 65/4015;

(Continued)

(56) References Cited

U.S. PATENT DOCUMENTS 6,513,003 B1 * 1/2003 Angell .................. H04L 65/602
704/235
7,886,001 B2 * 2/2011 Asthana ................. G06Q 10/10
709/204

(Continued)

OTHER PUBLICATIONS

"Acano solution", https://www.acano.com/publications/2016/09/Release-Notes-R1.8.17.pdf, Published on: Sep. 2016, 54 pages.

(Continued)

*Primary Examiner* — Patrice L Winder
(74) *Attorney, Agent, or Firm* — Newport IP, LLC; Mike R. Cicero

(57) ABSTRACT

Disclosed techniques provide for the management of immersion levels and notifications of conference activities that are of interest to a user. In some embodiments, a system can monitor a conference session, that a user is not attending, on the user's behalf to determine when activity that is of interest to the user occurs during the conference session. The system can then send a notification to the user to inform her of the identified activity. In some embodiments, the notification may enable the user to control her immersion level with respect to the conference session. For example, the notification may include user interface element(s) that the user may select to observe or even join the conference session. In some embodiments, the notification may enable the user to directly share content with attendees of the conference session without having to observe or join the conference session.

20 Claims, 15 Drawing Sheets

(58) Field of Classification Search
CPC ............ H04L 12/1822; H04L 12/1827; H04M 3/567; H04M 3/563
See application file for complete search history.

(56) References Cited

U.S. PATENT DOCUMENTS

| | | | |
|---|---|---|---|
| 8,180,722 B2 * | 5/2012 | John ..................... | G06F 16/288 706/48 |
| 8,798,252 B2 | 8/2014 | Krantz et al. | |
| 8,874,648 B2 * | 10/2014 | Beerse .................. | G06Q 10/00 709/204 |
| 8,917,306 B2 * | 12/2014 | Zhang ................ | H04L 12/1827 348/14.01 |
| 9,002,938 B2 * | 4/2015 | Bank .................. | H04L 12/1822 709/204 |
| 9,025,752 B2 * | 5/2015 | Blewett ................ | H04M 3/563 379/202.01 |
| 9,137,086 B1 * | 9/2015 | Naik ................... | H04L 29/0602 |
| 9,307,089 B2 | 4/2016 | Nasir et al. | |
| 9,319,228 B2 | 4/2016 | Anka | |
| 9,538,011 B1 | 1/2017 | Sherman et al. | |
| 9,652,113 B1 * | 5/2017 | Colson ................ | H04L 12/1822 |
| 9,813,495 B1 * | 11/2017 | Van Rensburg ........ | H04L 51/14 |
| 9,959,523 B2 * | 5/2018 | Lewis .................... | H04N 7/147 |
| 10,069,877 B2 * | 9/2018 | Chinnapatlolla ... | H04L 12/1822 |
| 2002/0038388 A1 * | 3/2002 | Netter ..................... | G06F 9/451 719/318 |
| 2004/0006628 A1 | 1/2004 | Shepard et al. | |
| 2008/0233933 A1 * | 9/2008 | Gilbert .................... | H04M 3/56 455/416 |
| 2009/0138554 A1 * | 5/2009 | Longobardi ........... | G06Q 10/10 709/204 |
| 2009/0225971 A1 * | 9/2009 | Miller ............... | H04M 3/42153 379/202.01 |
| 2010/0246571 A1 | 9/2010 | Geppert et al. | |
| 2011/0060591 A1 | 3/2011 | Chanvez et al. | |
| 2011/0153768 A1 * | 6/2011 | Carter .................... | G06Q 10/10 709/207 |
| 2011/0225013 A1 * | 9/2011 | Chavez .................. | G06Q 10/10 705/7.18 |
| 2011/0271192 A1 | 11/2011 | Jones et al. | |
| 2012/0224021 A1 * | 9/2012 | Begeja .................. | H04N 7/147 348/14.08 |
| 2013/0290870 A1 * | 10/2013 | Jones .................... | H04L 65/403 715/753 |
| 2014/0025734 A1 * | 1/2014 | Griffin .................. | G06Q 50/01 709/204 |
| 2015/0097922 A1 | 4/2015 | Le devehat et al. | |
| 2016/0314438 A1 * | 10/2016 | Berndtsson ........ | G06Q 10/1095 |
| 2016/0364665 A1 | 12/2016 | Hurst et al. | |
| 2017/0279859 A1 * | 9/2017 | Pogorelik ........... | H04L 65/1066 |

OTHER PUBLICATIONS

"Enhance Participant Engagement", http://www.eventsair.com/enhance-participant-engagement/, Retrieved on: Mar. 15, 2017, 3 pages.

"International Search Report and Written Opinion Issued in PCT Application No. PCT/US2018/028760", dated Jul. 11, 2018, 12 Pages.

* cited by examiner

MANAGING USER IMMERSION LEVELS AND NOTIFICATIONS OF CONFERENCE ACTIVITIES

BACKGROUND

At present, the use of conference (e.g., videoconference, teleconference, etc.) systems in personal and commercial settings has increased dramatically so that meetings between people in remote locations can be facilitated. In general, conference systems allow users, in two or more remote locations, to communicate interactively with each other via live, simultaneous two-way video streams, audio streams, or both. Some conference systems (e.g., CISCO WEBEX provided by CISCO SYSTEMS, Inc. of San Jose, Calif., GOTOMEETING provided by CITRIX SYSTEMS, INC. of Santa Clara, Calif., ZOOM provided by ZOOM VIDEO COMMUNICATIONS of San Jose, Calif., GOOGLE HANGOUTS by ALPHABET INC. of Mountain View, Calif., and SKYPE FOR BUSINESS provided by the MICROSOFT CORPORATION, of Redmond, Wash.) allow users to exchange files and/or share display screens that present, for example, images, text, video, applications, online locations, social media, and any others.

A user may be unable to join a conference session due to a scheduling conflict (e.g., another scheduled meeting at the same time, etc.). Even absent a scheduling conflict, the user may still choose not to join the conference session if she is interested in only a small segment of the conference session (e.g., a business executive speaking, the user's contribution being discussed, etc.). In these types of scenarios, if the user is interested in certain activity that may occur in a conference session that she does not attend, she typically must inform her colleagues of such an interest. Then, the user may have to rely on colleagues in attendance of the conference session to inform her of when the activity that she is interested in has occurred or is about to occur. Unfortunately, this added burden on both the user and her colleagues often results in the user missing notable activity that she would have preferred to witness live. Worse yet, all too often, the user may be left totally unware that such activity even occurred.

SUMMARY

The techniques disclosed herein address the problems described above with regard to a conference session. Specifically, the disclosed techniques provide for the management of immersion levels and notifications of conference activities that are of interest to a user. In some embodiments, a system can monitor a conference session, that a user is not attending, on the user's behalf to determine when activity that is of interest to the user occurs during the conference session. The system can then send a notification to the user to inform her of the identified activity. In some embodiments, in addition to providing the notification, one or more controls enable the user to control her immersion level, e.g. a level of access, with respect to the conference session. For example, one or more controls may include user interface element(s) that the user may select to observe activity of the conference session or even join the conference session. In some embodiments, the notification may enable the user to directly share content with attendees of the conference session without having to observe activity of the conference session or join the conference session.

Generally described, techniques disclosed herein enable a system to receive an indication of content that is of interest to a user and to notify the user when activity occurs (or is about to occur) with respect to the content of interest. The content of interest may include, for example, a data file, a specified portion of the data file, a username and/or user ID, or a user group. The activity that the system can identify may include, for example, the data file being shared and/or discussed during the conference session, a currently shared portion of the data file approaching and/or reaching the specified portion of the data file, the user name and/or user ID being mentioned during the conference session (e.g., verbally and/or in a written message), or a public conference session being initiated by one or more members of the user group. Consequently, the techniques described herein provide the user with a tool to stay informed of certain activities occurring even in conference sessions that she does not attend. In one example, the user may elect to be notified when she is specifically mentioned during a conference session (e.g., an "@mention"). In another example, the user may elect to be notified when the attendees of the conference session begin discussing and/or get close to discussing a specified portion of a data file (e.g., a predefined range of slides of a slide-based presentation that is being shared during the conference session).

In some examples, a user interface corresponding to a conference system may enable a user to generate notification parameters associated with receiving notifications of particular activities occurring during the conference session and/or control signals for controlling an immersion level of the user with respect to a conference session. Controlling the immersion level of the user may include transmitting a notification to a client computing device (also referred to herein as "client device") of the user in response to the system determining that the activity of interest has occurred (or is about to occur) during the conference session. In some examples, the notification may include one or more user interface elements that the user can select to modify an immersion level with respect to the conference session. For instance, the notification may enable the user to switch (e.g., toggle between, swap, etc.) immersion modes to perform actions such as joining the meeting (e.g., initiating a bidirectional audio and/or video stream, announcing her presence to the meeting attendees, or both), observing the meeting without joining (e.g., watching and/or listening to the meeting via a unidirectional-stream with or without announcing her presence to the meeting attendees), or even sharing content with the meeting attendees without joining or even observing any portion of the meeting. The user can select any of the immersion modes with or without notification to the session attendees of such a selection. There can be any suitable number of immersion modes, these examples are provided for illustrative purpose and are not to be construed as limiting.

As used herein, the term "immersion mode" may refer generally to a level of access a client device has with a conference session. For instance, one immersion mode may correspond to the client device performing bidirectional data streaming with respect to the conference session (e.g., the client device concurrently downloads and uploads data streams with respect to the conference session) whereas another immersion mode may correspond to the client device performing unidirectional data streaming with respect to the conference session (i.e., the client device downloads but does not upload data streams with respect to the conference session). In some instances, an immersion mode may correspond to the client device performing discrete (e.g., instance by instance) data transmissions with respect to the conference session (e.g., by transmitting data files to users whom are participating in the conference session) without uploading or downloading conference data, which may include streams of a conference session. Stated alternatively, such an "external content sharing" immersion mode may enable a user to share content with conference attendees without observing and/or joining the conference session.

As used herein, the term "active-participation mode" may refer generally to an immersion mode in which a client device performs bidirectional conference data streaming with respect to a conference session. For example, during an "active-participation mode," a client device may download a stream of conference data associated with one or more other participants while simultaneously uploading another stream of conference data associated with the user at the client device. As used herein, the term "observational mode" may refer generally to an immersion mode in which a client device performs unidirectional conference streaming with respect to a conference session. For example, during an "observational mode," a client device may download the stream of conference data associated with the one or more other participants without providing any upload of conference data associated with the user at the client device.

As used herein, the term "immersion level" refers generally to a position that is designated on an immersion scale that includes multiple different immersion modes. For example, in an implementation where an immersion scale includes four immersion modes (e.g., a first observational mode, a second observational mode, an active-participation mode, and an external content sharing mode), a user may select an immersion level along the immersion scale to instruct the client device and/or the system to operate in accordance with one or more of these four immersion modes.

In some examples, the system can concurrently monitor multiple conference sessions on behalf of a single user to notify the user when notable activity occurs during each of these multiple conference sessions. For instance, in a scenario where the single user is invited to several separate conference sessions that occur during the same timeslot, the user may be unable to simultaneously attend each of the conference sessions. However, while the user is attending one of the conference sessions, the system may monitor the other conference session(s) and notify the user when activity of interest to the user occurs in a particular conference session(s) that the user is not attending. In some examples, the system may display to the user a notification that describes the activity so the user can make an informed decision as to whether to take any particular action in response to the activity occurring. In one example, the notification may indicate a title of the conference session in which the activity occurred and/or an excerpt from the conference session that corresponds to the activity (e.g., a portion of a transcript of the conference session that is proximate to an "@mention" of the user).

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), device(s), method(s), computer-readable instructions, module(s), algorithms, hardware logic, and/or operation(s) as permitted by the context described above and throughout the document.

DRAWINGS

The Detailed Description is described with reference to the accompanying figures. In the figures, the left-most digit(s) of a reference number identifies the figure in which the reference number first appears. The same reference numbers in different figures indicates similar or identical items.

DETAILED DESCRIPTION

Examples described herein provide for the management of immersion levels through notifications of conference activities that are of interest to a user. Consequently, when a user is unable to attend a conference session (e.g., due to a scheduling conflict), a system may monitor one or more streams associated with the conference session to identify notable events and, ultimately, to notify the user of the identified notable events. For illustrative purposes, consider the nonlimiting scenario where a user sets notification parameters indicating that she would like to be notified via a "pop-up" notification and/or text message whenever a participant of a conference session specifically mentions her name (e.g., by "@mentioning" her user name). Under these circumstances, when the user is unable to attend a particular conference session, the system may monitor the conference session on her behalf to inform her when a user mentions her name. For example, a participant of the conference session may direct a particular comment at the user (e.g., the participant may "@mention" the user) and the system may identify this as a notable event that is worthy of sending a text message notification to the user on her mobile device.

Various examples, implementations, scenarios, and aspects are described below with reference to FIGS. 1 through 6.

Figure 1A:
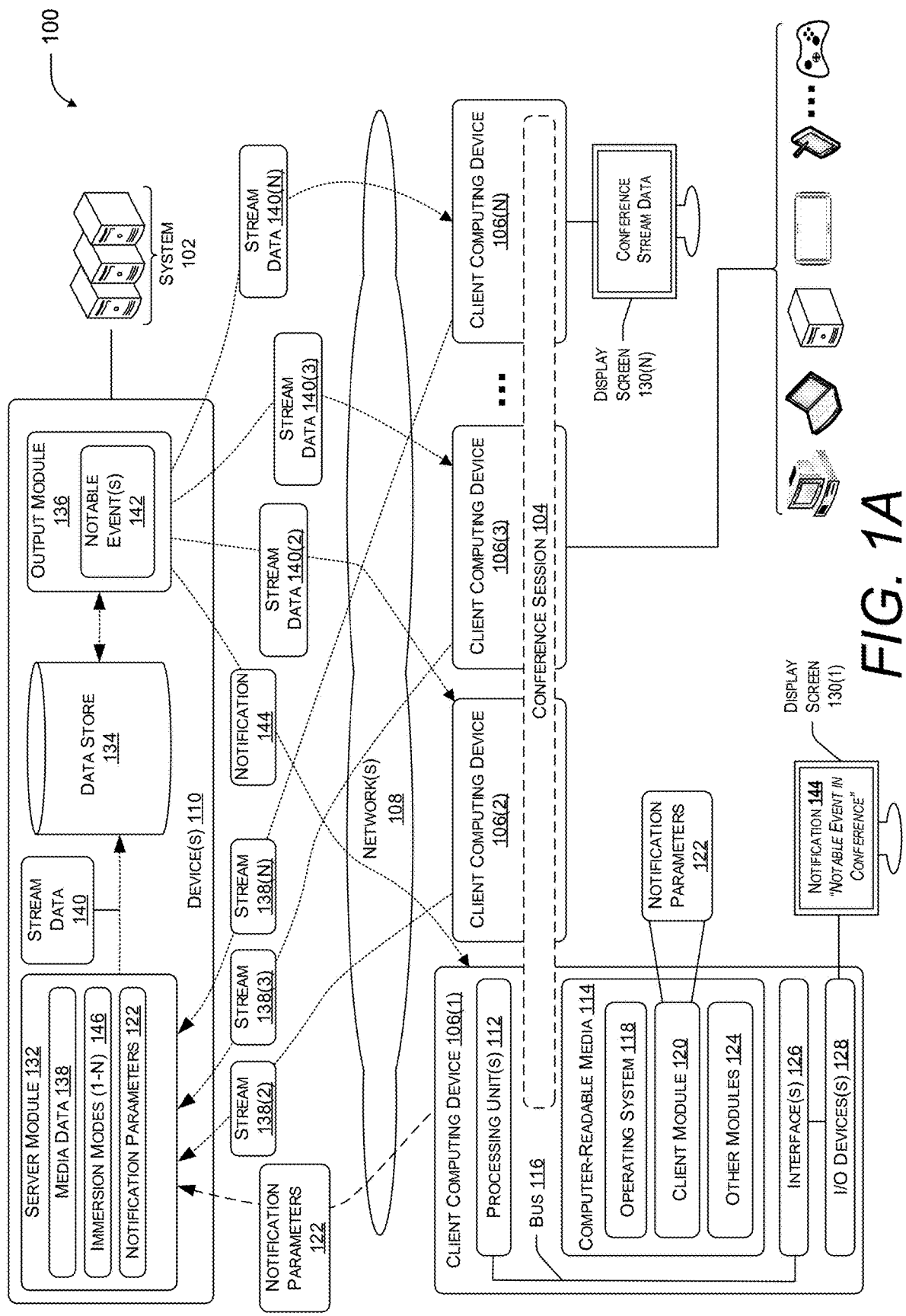
FIG. 1A is a diagram illustrating an example environment in which a system can operate to monitor a conference session on behalf of a user to identify a notable event and to cause a notification of the notable event to be displayed on a client computing device of the user.

FIG. 1A is a diagram illustrating an example environment 100 in which a system 102 can operate to monitor a conference session 104 to identify a notable event(s) (e.g., activity specified by predetermined notification parameters) and to cause a notification of the notable event(s) to be displayed on a client computing device 106(1) (also referred to herein as a "client device"). In this example, the conference session 104 is a live conference session that is being implemented between a number of client devices 106(2) through 106(N). The client devices 106(1) through 106(N) enable users to toggle between immersion modes associated with one or more of: actively participating in the conference session 104; passively observing the conference session 104 (e.g., receiving stream data without sharing content and/or announcing a presence); and/or sharing content with users corresponding to client devices 106(2) through 106(N). As illustrated, client devices 106(2) through 106(N), but not client device 106(1), are being utilized to actively participate in the conference session 104 (e.g., only these client devices are uploading media streams). In this example, the conference session 104 is hosted, over one or more network(s) 108, by the system 102. That is, the system 102 can provide a service that enables users of the client devices 106(1) through 106(N) to participate in the conference session 104. Consequently, a "participant" to the conference session 104 can comprise a user and/or a client device (e.g., multiple users may be in a conference room participating in the conference session 104 via the use of a single client device), each of which can communicate with other participants. As an alternative, the conference session 104 can be hosted by one of the client devices 106(1) through 106(N) utilizing peer-to-peer technologies.

As used herein, the integer "N" is used to denote an open-ended integer number of instances of various components described herein. Accordingly, where two or more different components (e.g., client device(s) 106, stream data instances 140, etc.) are described as having an $N^{th}$ number of instances, these components may have the same number of instances or may have different numbers of instances. For example, a first component having N instances may have the same number of instances, less instances, or more instances than a second component having N instances.

In examples described herein, client devices 106(1) through 106(N) are configured to participate in the conference session 104 by, for example, receiving and rendering for display, on a user interface of a display screen, stream data. The stream data can comprise a collection of various instances, or streams, of live content. For example, an individual stream of live content can comprise media data associated with a video feed (e.g., audio and visual data that capture the appearance and speech of a user participating in the conference session). Another example of an individual stream of live content can comprise media data that includes a graphical representation of a user (e.g., an avatar and/or a photograph) participating in the conference session 104 along with audio data that captures the speech of the user.

Yet another example of an individual stream of live content can comprise media data that includes a file displayed on a display screen along with audio data that captures the speech of a user. Accordingly, the various streams of live content within the conference data enable a remote meeting to be facilitated between a group of people and the sharing of content within the group of people. Conference data may also include other control data defining shared content between the participants, chat messages, audio streams, video streams, a start time and an end time, identities of the participants, etc.

In examples described herein, the stream data can also comprise recorded content. The recorded content can be requested for viewing by a client device 106. The recorded content can be previous content from a live conference session (e.g., conference session 104) that is currently progressing, or the recorded content can come from a completed conference session that previously occurred. In some instances, the recorded content can be configured as an individual stream to be shared as live content in a live conference session.

The system 102 includes device(s) 110. The device(s) 110 and/or other components of the system 102 can include distributed computing resources that communicate with one another and/or with the client devices 106(1) through 106(N) via the one or more network(s) 108. In some examples, the system 102 may be an independent system that is tasked with managing aspects of one or more conference sessions such as conference session 104. As an example, the system 102 may be managed by entities such as SLACK, WEBEX, GOTOMEETING, GOOGLE HANGOUTS, CISCO, FACEBOOK, MICROSOFT, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device (e.g., a server-type device), device(s) 110 may include a diverse variety of device types and are not limited to a particular type of device. Device(s) 110 may represent, but are not limited to, server computers, desktop computers, web-server computers, personal computers, mobile computers, laptop computers, tablet computers, or any other sort of computing device.

A client device (e.g., one of client device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client device can include, but is not limited to, a desktop computer, a game console and/or a gaming device, a tablet computer, a personal data assistant ("PDA"), a mobile phone/tablet hybrid, a laptop computer, a telecommunication device, a computer navigation type client device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorders ("PVR"), a set-top box, a camera, an integrated component (e.g., a peripheral device) for inclusion in a computing device, an appliance, or any other sort of computing device. Moreover, the client device may include a combination of the earlier listed examples of the client device such as, for example, desktop computer-type devices or a mobile-type device in combination with a wearable device, etc.

Client device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 may include, for example, an operating system 118, a client module 120, and other modules 124, programs, or applications that are loadable and executable by processing units(s) 112.

Client devices 106(1) through 106(N) may also include one or more interfaces 126 to enable communications between client devices 106(1) through 106(N) and other networked devices, such as device(s) 110, over network(s) 108. Such interface(s) 126 may include one or more network interface controllers (NICs) or other types of transceiver devices to send and receive communications and/or data over a network. Moreover, client devices 106(1) through 106(N) can include input/output ("I/O") interfaces that enable communications with input/output devices 128 such as user input devices including peripheral input devices (e.g., a game controller, a keyboard, a mouse, a pen, a voice input device such as a microphone, a touch input device such as a touch screen display, a gestural input device, and the like) and/or output devices including peripheral output devices (e.g., a display, a printer, audio speakers, a haptic output device, and the like). FIG. 1A illustrates that client device 106(1) is in some way connected to a display device (e.g., a display screen 130(1)) that is displaying a notification that notable event (e.g., some predetermined activity that is specified by predetermined notification parameters) has occurred (or is about to occur) within the conference session 104. FIG. 1A further illustrates that client device 106(N) is in some way connected to a display device (e.g., a display screen 130(N)) that is displaying stream data associated with the conference session 104.

In the example environment 100 of FIG. 1A, client devices 106(1) through 106(N) are configured to use their respective client modules 120 to connect with one another and/or other external device(s) in order to participate in the conference session 104 as described herein. For instance, a user may utilize client device 106(2) to communicate with another user that is using client device 106(3) and yet another user that is using client device 106(N). When deploying functionality of client modules 120, the users may share data, which may cause the client device 106(1) to connect to the system 102 and/or the other client devices 106(2) through 106(N) over the network(s) 108. Users may use the client module 120 of their respective client device(s) 106 to generate participant profiles, and provide the participant profiles to other client devices and/or to the device(s) 110 of the system 102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for conference sessions, invite users to participate in conference sessions, and/or to identify which particular user is associated with particular notification parameters and/or a particular notification. A participant profile may further include a user representation such as, for example, a photograph of the particular user, an avatar embodiment of the particular user (e.g., a cartoon graphic resembling the user), and/or any other icon or figure suitable for graphically representing the particular user (e.g., an image of an automobile or an inanimate object).

As shown in FIG. 1A, the device(s) 110 of the system 102 includes a server module 132, a data store 134, and an output module 136. The server module 132 is configured to receive, from individual client devices such as client devices 106(1) through 106(N), individual media streams such as media streams 138(2) through 138(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 132 is configured to receive a collection of various media streams 138(1) (shown in FIG. 1E only) through 138(N) (the collection being referred to herein as media data 138). In some scenarios, not all the client devices that are receiving data associated with the conference session 104 provide a media stream. For example, a client device may only be a consuming, or an "observing," device such that it only receives content associated with the conference session 104 but does not provide any content to the conference session 104.

The server module 132 is configured to generate stream data 140 based on the media data 138. In various examples, the server module 132 can select aspects of the media data 138 that are to be shared with the participating client devices 106(2) through 106(N) (and client device 106(1) in accordance with the data flow scenario of FIG. 1E). Consequently, the server module 132 may configure the stream data 140 for the individual client devices 106(1) through 106(N). For example, stream data 140 can be divided into individual instances referenced as 140(2) through 140(N) (and 140(1) when applicable).

Upon generating the stream data 140, the server module 132 may be configured to store the stream data 140 in the data store 134 and/or to pass the stream data 140 to the output module 136. The output module 136 may communicate stream data instances 140(2) through 140(N) to the client devices 106(1) through 106(N). Specifically, in the illustrated example, the output module 136 communicates stream data instance 140(2) to client device 106(2), stream data instance 140(3) to client device 106(3), and stream data instance 140(N) to client device 106(N), respectively.

With respect to the dataflow scenario as illustrated in FIG. 1A as it relates specifically the client device 106(1), the client device 106(1) is not currently operating in an immersion mode that is associated with receiving a corresponding stream data instance, i.e. stream data instance 140(1). In particular, as illustrated in FIG. 1A, the client device 106(1) is operating in a "non-immersive mode" in which the client device 106(1) is not actively uploading a corresponding media stream and is also not downloading stream data.

As further illustrated, the client device 106(1) provides the server module 132 with notification parameters 122 that indicate content as being of interest to one or more particular users (also referred to herein as "content of interest") and/or activities that, when occurring in association with the content of interest, may warrant a notification(s) being sent to the one or more particular users. The content of interest indicated within the notification parameters 122 may include, for example, a data file, a specified portion of the data file, a username and/or user ID, or a user group. The activities indicated by the notification parameters 122 and which the system can identify with respect to the content of interest may include, but are not limited to, sharing, discussing, and/or generating the content of interest during the conference session 104.

As used herein, a particular activity occurring with respect to particular content of interest may be referred to generally as a "notable event." Exemplary notable events include, but are not limited to, a particular data file being shared and/or discussed during the conference session 104, a currently shared portion of the data file approaching and/or reaching a portion of the data file that is specifically indicated in the notification parameters 122, a username and/or user ID being mentioned during the conference session 104 (e.g., an "@mention"), a conference session being initiated by one or more members of a specific user group, a particular user joining and/or contributing to (e.g., verbally speaking during) the conference session 104, a particular topic being discussed during the conference session 104, a threshold number of total users joining and/or observing the conference session 104, a threshold number of users from a particular group joining and/or observing the conference session 104, etc.

In some instances, the notification parameters 122 may be received by the server module 132 prior to a commencement time of the conference session 104, subsequent to a termination time of the conference session 104, or subsequent to the commencement time and prior to the termination time. Stated alternatively, the notification parameters 122 may be received by the server module 132 before, during, or after the conference session 104.

The server module 132 may analyze the media data 138 based on the notification parameters 122 to identify notable events 142. In some implementations, the server module 132 may identify when a particular activity has occurred with respect to a particular content of interest. For example, the server module 132 may analyze the media data 138 to determine that a particular user associated with one or more of client devices 106(2) through 106(N) has specifically "@mentioned" a user associated with the client device 106(1). In some implementations, the server module 132 may determine that a particular activity is about to occur with respect to a particular content of interest. For example, the server module 132 may determine that a currently shared portion of a specified data file that is being shared within the conference session 104 is approaching a user specified portion of the specified data file. As a more specific but nonlimiting example, suppose that a slide deck is being shared during the conference session 104 and that a participant is currently sharing slide number 100. Further suppose that the notification parameters 122 indicate that the user associated with the client device 106(1) has flagged slides 110 through 135 as being of interest. Under these circumstances, the server module 132 may determine a rate at which the participants are progressing through the slide deck to determine that the participants will reach the content of interest within a relatively short period of time (e.g., 1 minute, 3 minutes, 5 minutes, etc.).

In some examples, in response to identifying a notable event(s) 142, the server module 132 may transmit a notification 144 to the client device 106(1) to inform the user associated with client device 106(1) of the notable event(s) 142. In some examples, the notification 144 may cause the client device 106(1) to display (or otherwise provide access to) one or more user interface elements (UIEs) that enable a user to manage an immersion level with respect to the conference session 104. For example, the one or more UIEs may enable the user to select one or more individual immersion modes of a plurality of immersion modes 146 that include a first immersion mode through an $N^{th}$ immersion mode. In some examples, the one or more UIEs may enable the user to provide a physical user input (e.g., by selecting a graphically rendered UIE) to manage the immersion level with respect to the conference session 104. In some examples, the one or more UIEs may enable the user to provide a verbal input (e.g., by verbally speaking a user command within audible range of the client device 106(1)) to manage the immersion level with respect to the conference session 104.

In some embodiments, the notification 144 may be added to a forum and/or dashboard that is associated with the user. For example, a user may utilize an electronic dashboard to monitor important activities and/or tasks by periodically logging into the dashboard to check-in on the user's progress for certain tasks, check a "to-do" list, receive notifications of certain events, etc. Accordingly, in some instances, the system 102 may automatically add the notification 144 to the forum and/or dashboard so that the user will receive the notification 144 the next time she logs in to check on her tasks and/or notable events.

Figure 1B:
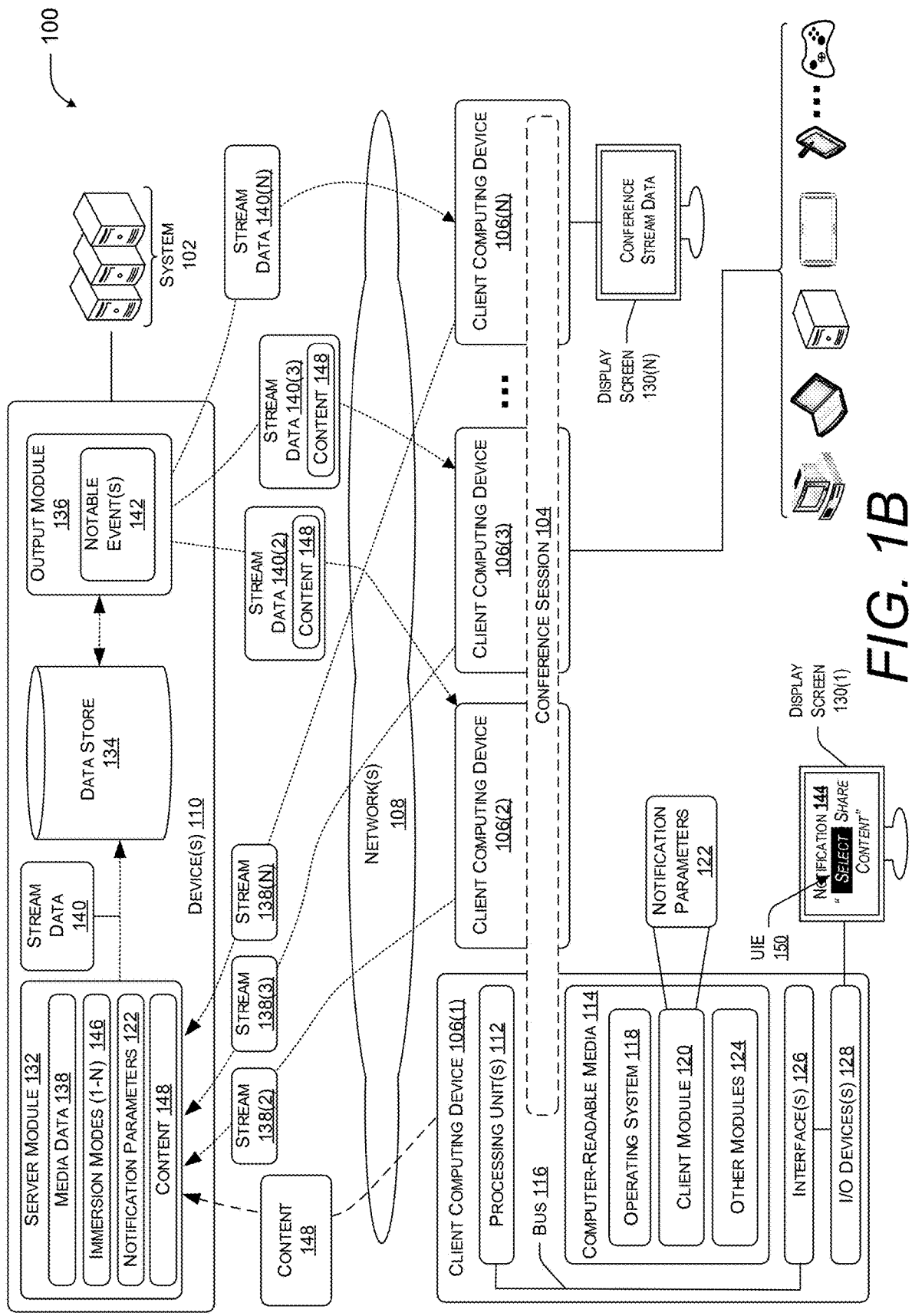
FIG. 1B is a diagram illustrating a data flow scenario in which the system of FIG. 1A can operate to enable a user to share content with participants of a conference session without actively participating in, or even observing, the conference session.

Turning now to FIG. 1B, a diagram is illustrated of a data flow scenario in which the system 100 can operate to enable a user of the client device 106(1) to share content 148 with participants of the conference session 104 without actively participating in, or even observing, the conference session 104. As illustrated in FIG. 1B, the client device 106(1) causes a display screen 130(1) to render aspects of the notification 144 that includes at least one UIE 150 to enable a user to share the content 148. For example, the UIE 150 may be selectable by the user to cause the client device 106(1) to open a file browsing module that is configured to enable the user to browse through a folder architecture of an operating system on the client device 106(1) and, ultimately, to select one or more individual data files to share with the conference session 104 without causing the client device 106(1) to operate in an active participation mode and/or an observational mode.

With respect to the dataflow scenario as illustrated in FIG. 1B, as illustrated the client device 106(1) is not currently operating in an immersion mode that is associated with receiving a corresponding stream data instance (i.e. 140(1)). In particular, as illustrated in FIG. 1A, the client device 106(1) is operating in a "notification mode" associated with rendering notification data, from the notification 144, on the display screen 130(1). Furthermore, the client device 106(1) is not operating in any particular immersion mode which causes the client device to actively upload and/or download media streams in association with the conference session 104. In various implementations, one or more immersion modes of the plurality of immersion modes 146 may be mutually exclusive with one or more other immersion modes of the plurality of immersion modes 146. For example, in some implementations the plurality of immersion modes 146 may include a first immersion mode and a second immersion mode that an individual client device cannot operate in concurrently with the first immersion mode. In various implementations, one or more immersion modes of the plurality of immersion modes 146 are not mutually exclusive with one or more other immersion modes of the plurality of immersion modes 146. For example, in some implementations an individual client device may be able to concurrently operate in a first immersion mode and a second immersion mode.

As illustrated, the client device 106(1) is shown to transmit content 148 such as, for example, a user selected data file, a message that is written and/or recorded by the user, and/or any other content that is suitable for transmitting into the conference session 104. Upon receiving the content 148, the server module 132 may be configured to further generate the stream data 140 based on the content 148 that is received from the client computing device 106(1) in addition to the media data (e.g., stream 138(2), stream 138(3), etc.).

In some implementations, the content 148 may be transmitted to one or more of client device 106(2) through client device 106(N) within a respective instance of the stream data 140. For example, by activating the UIE 150 of the notification 144 the user of the client device 106(1) may be able to seamlessly share the content 148 with all of the participants of the conference session 104 without actually becoming an observer and/or a participant of the conference session 104. In some implementations, the content 148 may be transmitted to some but not all of the participants of the conference session 104. For example, as illustrated in FIG. 1B, the server module 132 has included the content 148 in only two of the three illustrated stream data instances. In various implementations, the one or more UIEs 150 may enable the user to designate whom to transmit the content 148 to by individually selecting and/or deselecting specific users and/or groups of users that are participating in the conference session 104.

In some implementations, the content 148 may become available to all participants of a conference session while only a selected subset of the participants receives notifications of the content 148. For example, a user may select a subset of the participants to notify that content 148 is being shared with the group of participants. Then, the content 148 may be transmitted to the system 102 which then adds the content 148 to the stream data 140 that is transmitted to the client devices 106(2) through 106(N). Accordingly, access to the content 148 may be provided to all participants of the conference session 104. Then, one or more notifications of the content 148 becoming available may be sent to the selected subset of the participants.

Figure 1C:
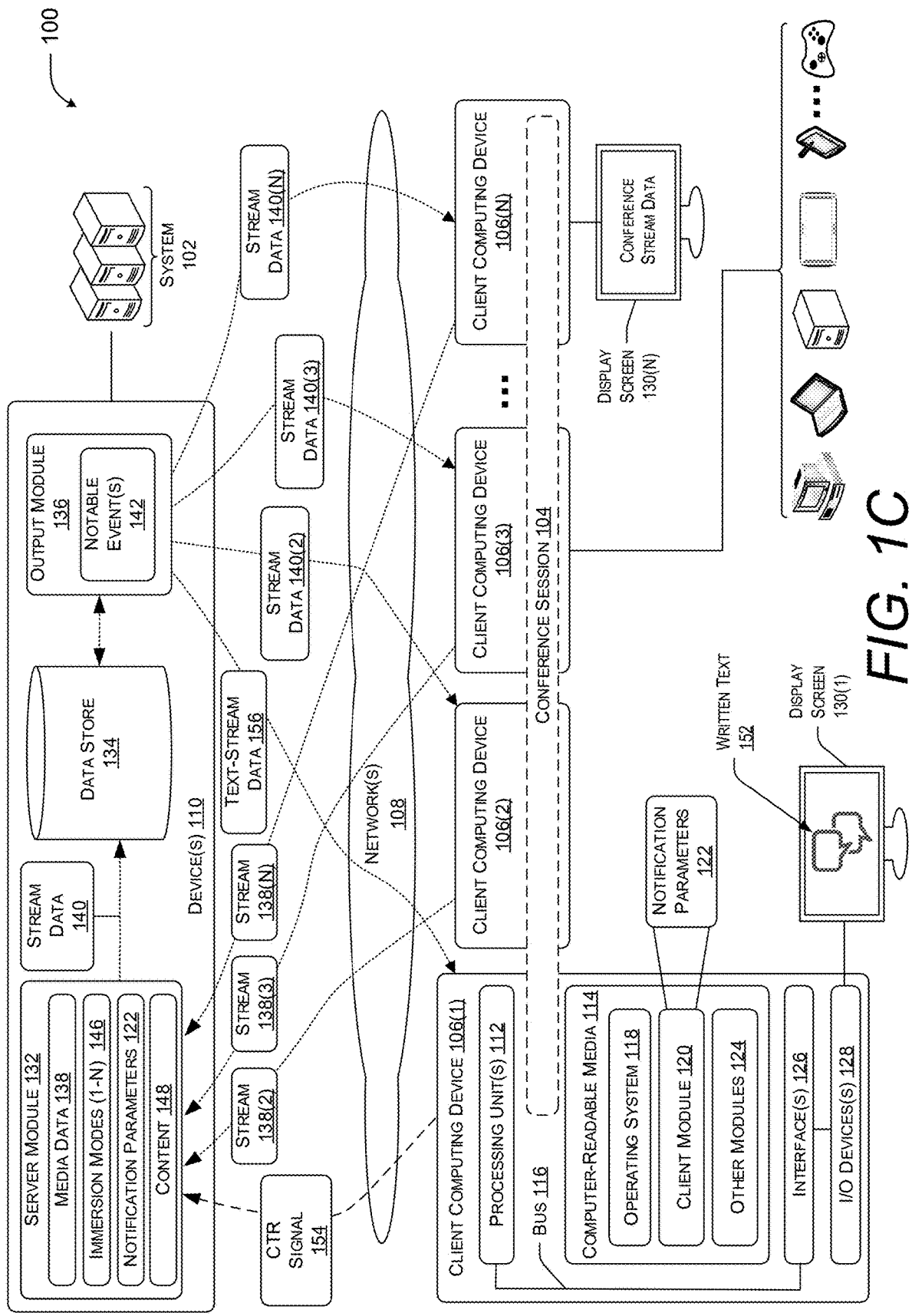
FIG. 1C is a diagram illustrating a data flow scenario in which the system of FIG. 1A can operate to enable a user to view written text associated with verbal and/or textual written contributions of the participants of the conference session without actively participating in the conference session.

Turning now to FIG. 1C, a diagram is illustrated of a data flow scenario in which the system 102 can operate to enable a user of the client device 106(1) to view written text 152 associated with contributions of the participants of the conference session 104 without actively participating in the conference session 104. For example, the notification 144 (not shown in FIG. 1C) may cause the client device 106(1) to render one or more UIEs that enable the user to generate a control signal 154. The control signal 154 may be transmitted to the server module 132 to cause the output module 136 to begin transmitting conference text-stream data 156 to the client device 106(1). For example, the server module 132 may process the media data 138 to transcribe audibly spoken words of participants of the conference session 104 and/or written messages transmitted between participants of the conference session 104. As illustrated, the client device 106(1) is shown to actively download a stream of data (i.e., the conference text-stream data 156) in association with the conference session 104 without actively uploading any stream of data in association with the conference session 104. For example, the control signal 154 may be considered a discrete data transmission (e.g., once the discrete amount of data is uploaded the transmission is finished) that occurs in the event that the user selects the UIE 150 to adjust her immersion level to an "external content sharing" immersion mode rather than a data transmission that occurs continuously with respect to the conference session 104.

Figure 1D:
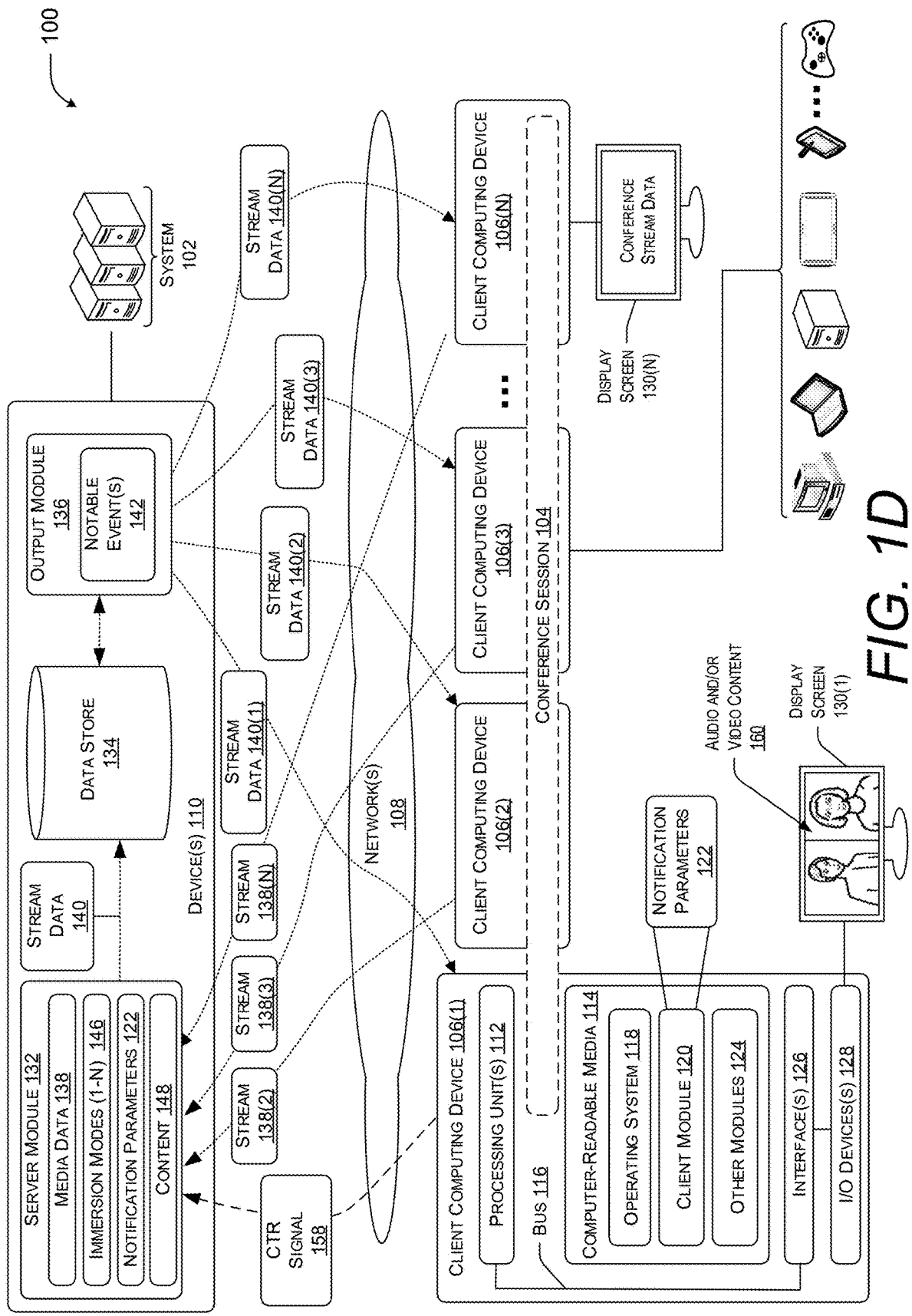
FIG. 1D is a diagram illustrating a data flow scenario in which the system of FIG. 1A can operate to enable a user to visually and/or audibly observe the conference session without actively participating in the conference session.

Turning now to FIG. 1D, a diagram is illustrated of a data flow scenario in which the system 102 can operate to enable a user of the client device 106(1) to visually and/or audibly observe the conference session 104 without actively participating in the conference session 104. For example, the notification 144 (not shown in FIG. 1D) may cause the client device 106(1) to render one or more UIEs that enable the user to generate a control signal 158. The control signal 158 may be transmitted to the server module 132 to cause the output module 136 to begin transmitting stream data 140(1) to the client device 106(1). For example, the server module 132 may process the media data 138 to generate a stream data instance 140(1) in association with the client device 106(1) to enable the user to observe audio and/or video content 160 at the client device 106(1) that is similar to and/or identical to audio and/or video content viewed by the conference participants at client devices 106(2) through 106(N). As illustrated, the client device 106(1) is shown to actively download a stream of data (i.e., the stream data 140(1)) in association with the conference session 104 without actively uploading any stream of data in association with the conference session 104.

In some implementations, the system 102 may determine a salient portion of a data file that is being shared during the conference session 104 and cause the salient portion to be automatically displayed in the data flow scenario FIG. 1D. Consequently, the user may be able to leisurely observe the conference session 104 without actively monitoring at which portion of the shared data file the discussion is presently taking place. Then, each time the user brings her attention back to the content 160 shown on the display screen, she may quickly be informed as to how the conference session 104 is progressing. In various implementations, the system 102 may identify a particular portion as being salient based on factors such as, but not limited to, the particular portion being actively edited by an active participant of the conference session; the particular portion being actively viewed by a threshold level of active participants; or the particular portion being actively shared by a predetermined active participant.

Figure 1E:
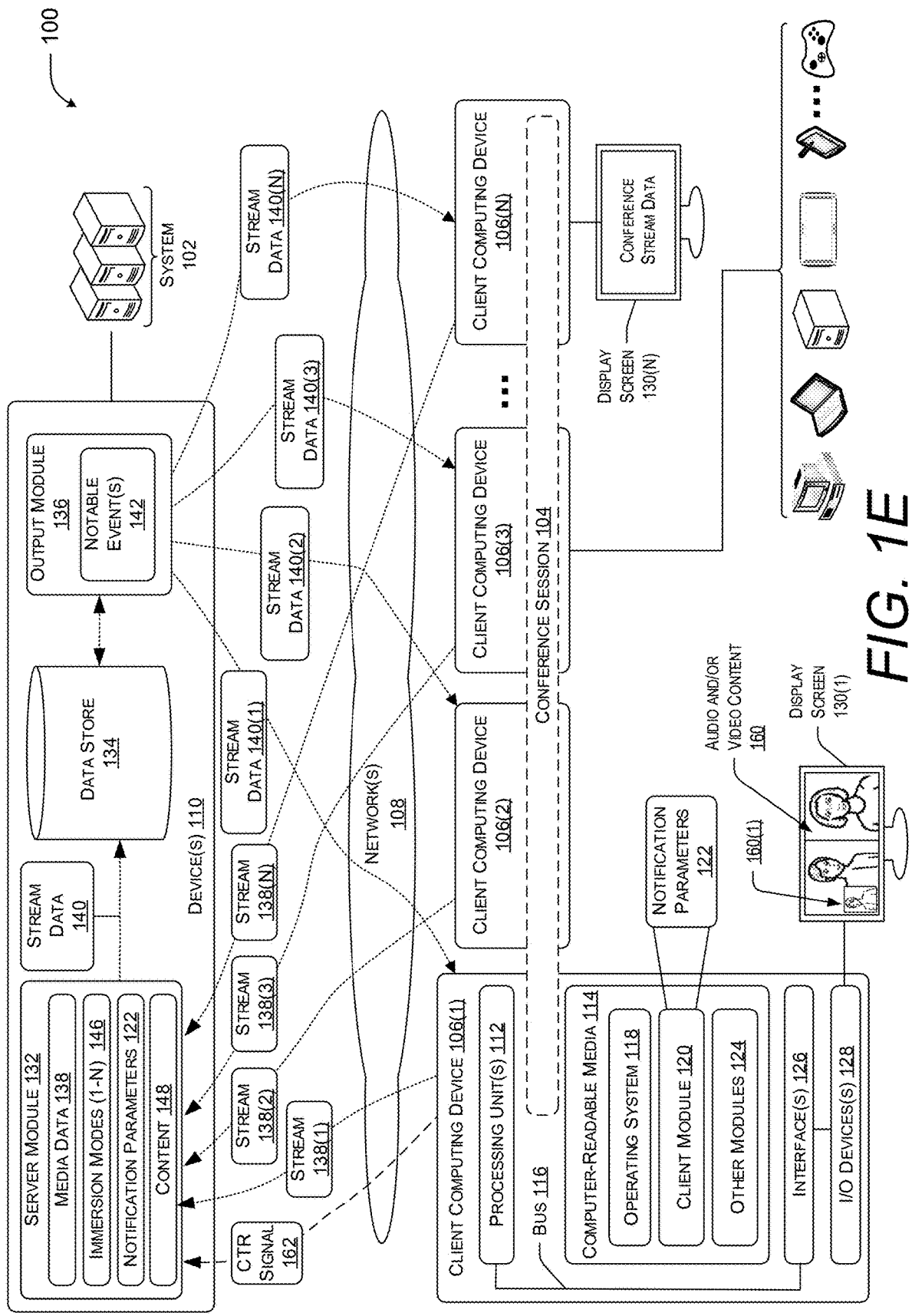
FIG. 1E is a diagram illustrating a data flow scenario in which the system of FIG. 1A can operate to enable a user to actively participate in the conference session by both visually and/or audibly observing media associated with the conference session while also providing a video and/or audio stream to contribute to the conference session.

Turning now to FIG. 1E, a diagram is illustrated of a data flow scenario in which the system 102 can operate to enable a user of the client device 106(1) to visually and/or audibly observe the conference session 104 while also actively participating in the conference session 104. For example, the notification 144 (not shown in FIG. 1E) may cause the client device 106(1) to render one or more UIEs that enable the user to generate a control signal 162. The control signal 162 may be transmitted to the server module 132 to cause the output module 136 to begin transmitting stream data 140(1) to the client device 106(1). For example, the server module 132 may process the media data 138 to generate a stream data instance 140(1) in association with the client device 106(1) to enable the user to observe audio and/or video content 160 at the client device 106(1) that is similar to and/or identical to audio and/or video content viewed by the conference participants at client devices 106(2) through 106(N). Selecting the one or more UIEs may further cause the client device 106(1) to begin to actively upload media stream 138(1) in association with the conference session 104. In some implementations, the audio and/or video content 160 displayed at the client device 106(1) may include self-view content 160(1) (e.g., a video stream of the user at the client device 106(1) as seen by users at the client devices 106(2) through 106(N)) to show the user how she appears to the other users.

In accordance with the present description, it can be appreciated that each of the data flow scenarios illustrated in FIG. 1C and FIG. 1D correspond to a respective "observational mode" in which the client device 106(1) is operating to enable the user to observe aspects of the conference session 104 without actively contributing to (e.g., uploading media data in association with) the conference session 104. It can be further appreciated that the data flow scenario illustrated in FIG. 1E, corresponds to an "active-participation mode" in which the client device 106(1) is operating to enable the user to observe aspects of the conference session 104 while concurrently uploading a media stream 138(1) in association with the conference session 104 to enable the user at the client device 106(1) to actively participate within a discussion taking place during the conference session 104.

Figure 2:
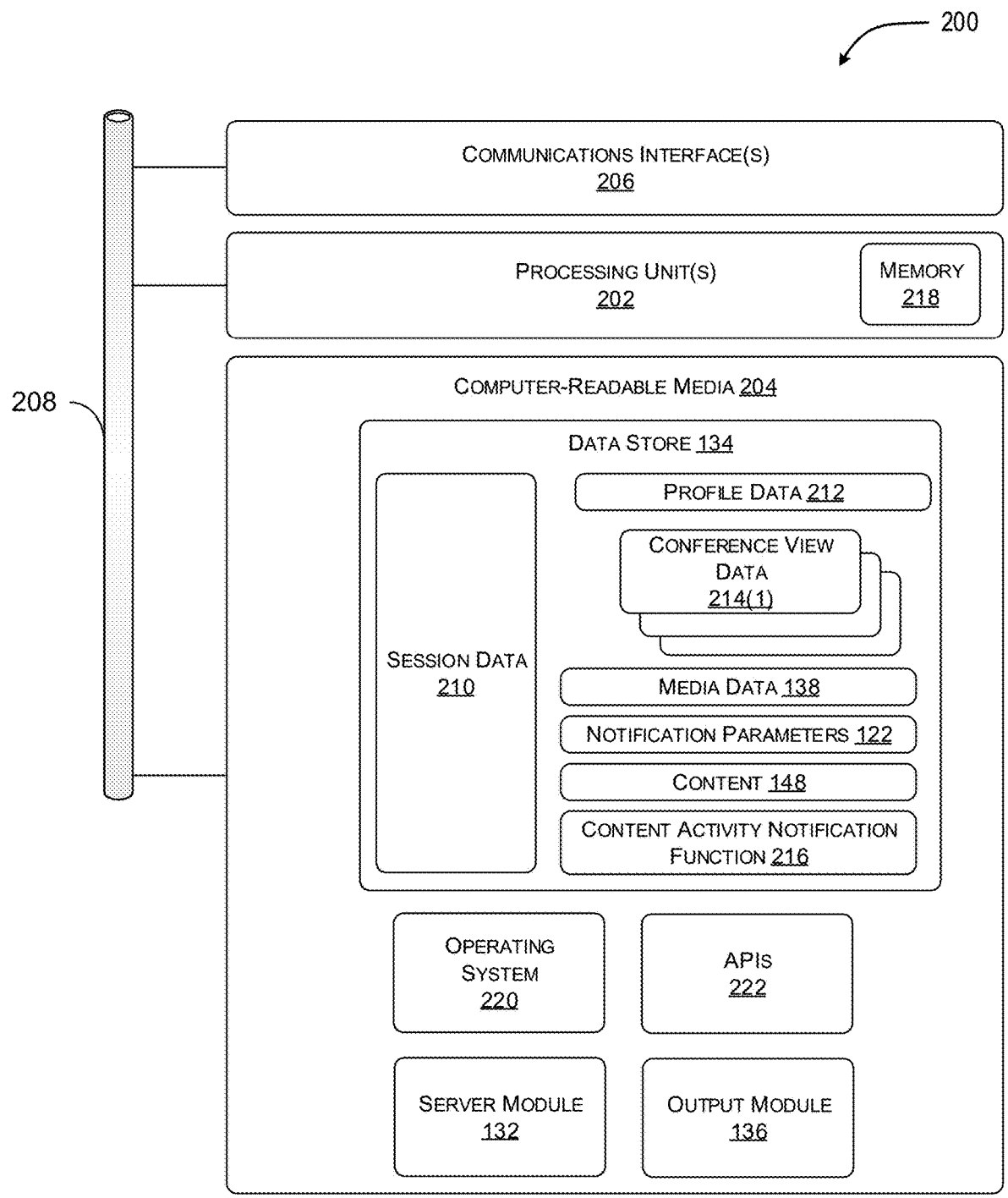
FIG. 2 is a block diagram of an example of the device(s) in the conference system of FIG. 1A.

In FIG. 2, a system block diagram is shown illustrating components of an example device 200 configured to provide the conference session 104 between a plurality of devices, such as client devices 106(1) through 106(N), in accordance with an example implementation. The device 200 may represent one of device(s) 110 where the device 200 includes one or more processing unit(s) 202, computer-readable media 204, and communication interface(s) 206. The components of the device 200 are operatively connected, for example, via a bus 208, which may include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s) 202. The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communications media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network. The communication interfaces 206 are used to facilitate communication over a data network (e.g., the network 108) with client devices 106.

In the illustrated example, computer-readable media 204 includes the data store 134. In some examples, the data store 134 includes data storage such as a database, data warehouse, or other type of structured or unstructured data storage. In some examples, the data store 134 includes a corpus and/or a relational database with one or more tables, indices, stored procedures, and so forth to enable data access including one or more of hypertext markup language ("HTML") tables, resource description framework ("RDF")

tables, web ontology language ("OWL") tables, and/or extensible markup language ("XML") tables, for example.

The data store 134 may store data for the operations of processes, applications, components, and/or modules stored in computer-readable media 204 and/or executed by processing unit(s) 202 and/or accelerator(s). For instance, in some examples, the data store 134 may store session data 210 (e.g., stream data 140), profile data 212, and/or other data. The session data 210 may include a total number of participants in the conference session 104, and activity that occurs in the conference session 104 (e.g., behavior, activity of the participants), and/or other data related to when and how the conference session 104 is conducted or hosted and/or notable events that occur during the conference session 104. Examples of profile data 212 include, but are not limited to, a participant identity ("ID"), a user representation that corresponds to the participant ID, and other data.

In an example implementation, the data store 134 stores data related to the various views each participant experiences on the display of their respective client device(s) 106 while participating in and/or "observing" on the conference session 104. As shown in FIG. 2, the data store 134 may include conference view data 214(1) through 214(N) corresponding to respective views shown (or not shown) on each client device 106(1) through 106(N) associated with the conference session 104. In this manner, the system 102 may support individual control over the view each user experiences during the conference session 104. For example, as described in more detail below with reference to FIGS. 3-6, the system 102 may analyze the media streams 138(2) through 138(N) to identify notable events as indicated in the notification parameters 122. Then, based on the identified notable events, the system 102 may transmit a notification 144 to the client device 106(1) during and/or after the conference session 104 to notify a user that is not participating in the conference session 104 (at least at the time the notable event occurred) of the notable event. Furthermore, with particular reference to FIG. 4A through 4B, the notification 144 may enable the user to share content with conference participants without becoming immersed into the conference session 104 (e.g., either observing or participating in the conference session).

The data store 134 may store the session data 210, profile data 212, conference view data 214, media data 138, notification parameters 122, content 148, and a content activity notification function 216. Alternately, some or all of the above-referenced data can be stored on separate memories 218 on board one or more processing unit(s) 202 such as a memory on board a CPU-type processor, a GPU-type processor, an FPGA-type accelerator, a DSP-type accelerator, and/or another accelerator. In this example, the computer-readable media 204 also includes an operating system 220 and an application programming interface(s) 222 configured to expose the functionality and the data of the device(s) 110 (e.g., example device 200) to external devices associated with the client devices 106(1) through 106(N). Additionally, the computer-readable media 204 includes one or more modules such as the server module 132 and an output module 136, although the number of illustrated modules is just an example, and the number may vary higher or lower. That is, functionality described herein in association with the illustrated modules may be performed by a fewer number of modules or a larger number of modules on one device or spread across multiple devices.

As described above, when a user (and/or an administrator having at least some control over the user's account) supplies notification parameters 122 to the system 102, the system 102 may then analyze media data 138 to automatically notify the user of notable events 142. For example, upon receiving the media streams 138, the system 102 may deploy the content activity notification function 216 to identify when activity occurs during the conference session 104 with respect to content that is designated as being of interest to the user. For example, if a participant of the conference session 104 specifically "@mentions" the user associated with the client device 106(1), the system 102 may determine based on the notification parameters 122 that the user has elected to be notified of such events and, ultimately, the system 102 may transmit the notification 144 to the client device 106(1). In some implementations, the content activity notification function 216 may be configured to escalate notification types if the user associated with the client device 106(1) does not timely respond to and/or provide a read receipt of the notification 144. For example, if a predetermined threshold of time passes following the transmission of the notification 144 during which the system 102 is unable to determine whether the user has been informed of the notable event, the system 102 may transmit a second notification (e.g., a text message) to another client device such as, for example, a cell phone (not shown) that is associated with the user corresponding to the client device 106(1).

Figure 3A:
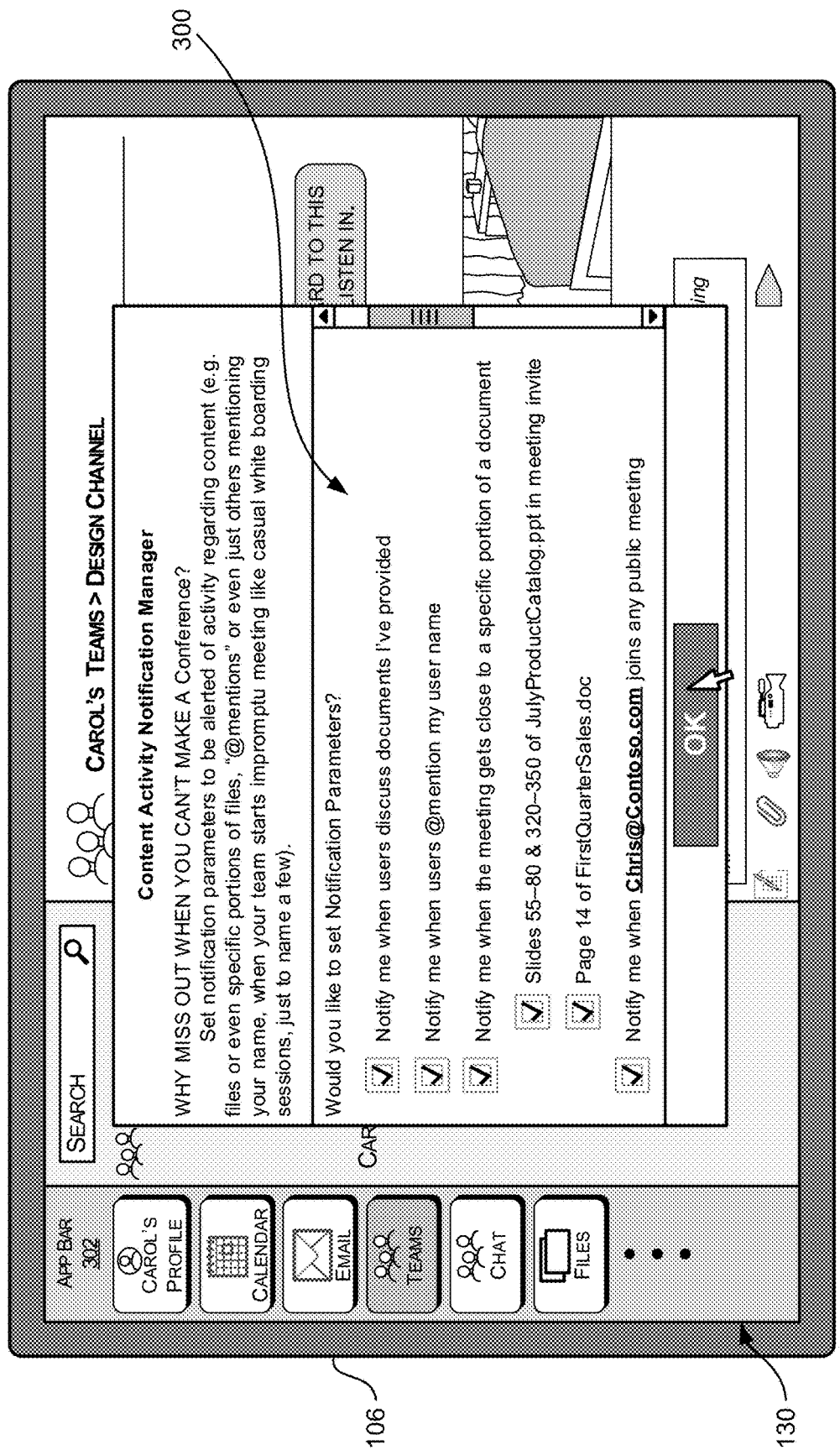
FIGS. 3A and 3B illustrate various aspects of a content activity notification manager user interface (UI) that can be displayed on a client device to enable a user to set notification parameters for association with a user account.

Turning now to FIG. 3A, illustrated here are various aspects of a content activity notification manager user interface (UI) 300 that can be displayed on the client device 106 to enable a user to set notification parameters 122 in accordance with an example implementation of the techniques described herein. In this example, the GUI 300 comprises an application bar 302 (also referred to herein as an "app bar"). The application bar 302 can be configured with a number of graphical elements, each associated with different functionality and/or content. For example, as illustrated, the graphical elements may be selectable by a user to provide access to content having a number of predetermined data types including, but not limited to, profile data, calendar data, email data, team forum data, chat forum data, file and/or document data, and any other data types accessible by a computing device. The selectable graphical elements can each provide access to files having data types and/or a category of functionality, such as a calendar program, email program, team forum program, chat forum program, image program, video program, document program, and other programs.

For illustrative purposes, profile data can include a user's name, a user representation, a user ID, phone number, or any other information associated with the user. The profile data can be accessed and displayed in response to a user selection of the first ("Profile") graphical element. Calendar data can include a user's appointments stored in one or more calendar databases. The calendar data can be accessed and displayed in response to a user selection of the second ("Calendar") graphical element. Email data can include a user's email messages and tasks stored in one or more email databases. The email data can be accessed and displayed in response to a user selection of the third ("Email") graphical element. These examples of content data are provided for illustrative purposes and are not to be construed as limiting. It can be appreciated that other types of content data can be listed on the App bar 302 and made available for selection and display on the graphical user interface 300.

For illustrative purposes, a team can be defined as a group of one or more specified users. In some configurations, a team includes a specified group of users that are invited to a team. In some implementations, data associated with the team, such as related messages and chat discussions, cannot be accessed by a user unless the user receives an invitation and accepts the invitation. For example, as illustrated, the user "Carol" has been invited to and has accepted membership in a "Design Channel" Team. Once a user is invited to a team, that user can join one or more "channels" associated with the team. A channel, also referred to herein as a "channel forum," can be defined by a custom group of users interested in a particular subject matter. For example, a team may have a "Shipping" channel, a "Development Schedule" channel, etc. In some implementations, the conference session 104 is provisioned in association with a channel forum to enable the users of that channel to communicate in real time through the media streams 138. In some implementations, the conference session 104 may be provisioned independent of a channel forum (e.g., by a stand-alone teleconferencing software application).

A chat, also referred to as a "chat forum," can include a specified group of users. In some configurations, users are only included in a chat by invitation. A chat session may exist between a group of users independent of their membership in a particular team and/or channel. Thus, a participant of the conference session 104 can chat with users that are not members of a common team and that do not subscribe to a common channel. For example, a particular user may initiate a "chat" with one or more other users that are members of a common team with the particular user, are not members of a common team with the particular user, subscribe to a common channel with the particular user, and/or do not subscribe to a common channel with the particular user. Users associated with a chat forum can share and view text, images, and other data objects posted within a specific chat forum. In some implementations, the system 102 may provision instant messaging (IM) (e.g., "chat") functionality to the users associated with the conference session 104 to enable them to share and view text, images, and other data objects posted directly within the conference session 104 via one or more of the media streams 138. Consequently, the techniques described herein can be deployed to identify notable events that occur within the provisioned IM functionality. For example, a participant of the conference session 104 may use the IM functionality to route a question to a user that is not participating in and/or observing the conference session. To further illustrate this point, a user may post "@Carol sorry you couldn't make today's meeting. Can you upload that file into this meeting right now? I'd love to show everybody what you've done!" as an instant message within the conference session 104. Then, in response to this message the system 102 may send Carol a notification of the message and even enable her to seamlessly share the requested file.

As illustrated in FIG. 3A, in various implementations, aspects of the content activity notification manager (UI) 300 may communicate details associated with the types of activity and/or content of interest that can be designated within notification parameters 122 to trigger the notification 144 to be transmitted to the client device 106. In the illustrated example, the content activity notification manager (UI) 300 is informing the user that the system 102 is configured to notify her (if she so choses) if and when various enumerated activities occur during the conference session 104 regardless of her immersion level (or lack thereof) in the conference session 104. More specifically, as illustrated in FIG. 3A, the content activity notification manager UI 300 enables the user to set notification parameters 122 which cause the system 102 to analyze the media data 138 and, ultimately, to notify the user when predefined events occur and/or are about to occur during the conference session 104.

As illustrated, the user has set notification parameters 122 to be notified under a variety of circumstances. It can be appreciated that the specific circumstances illustrated and/or discussed herein are exemplary only and are not to be construed as limiting of the circumstances in which the techniques described herein can be deployed. In particular, the techniques described herein may be deployed to notify one or more users of any type of event that is considered to be notable and that is capable of detection by the system 102. It can further be appreciated that according to the techniques described herein a user may gain the flexibility to skip out on segments of conferences which are of no interest while having the peace of mind that she will be being notified in real time when segments that are of interest have begun and/or are about to begin. Therefore, a user can freely "jump in" and "jump out" of a conference session 104 without undue risk of missing important activities.

In some examples, the content activity notification manager UI 300 may enable a user to set notification parameters 122 to trigger the notification 144 when participants of the conference session 104 discuss (or are about to discuss) particular files. For example, the notification 144 may be triggered when users begin discussing and/or sharing (e.g., via screen sharing through one or more of the media streams 138) files that the user provided for the conference session 104 (e.g., documents that the user has saved in association with a calendar event and/or email meeting invite associated with the conference session 104). As another example, the notification 144 may be triggered when users begin discussing and/or sharing any other file that the user has indicated as being of interest.

In some examples, the content activity notification manager UI 300 may enable a user to set notification parameters 122 to trigger the notification 144 when one or more participants of the conference session 104 mention the user. For example, the system 102 may process the media data 138 to identify instances when participants verbally mention the user's name and, ultimately, in response thereto, to generate the notification 144. In some embodiments, upon identifying that a particular participant has mentioned the user's name, the system 102 may notify the particular participant and request an instruction as to whether to notify the user. In some examples, the system 102 may process the media data 138 to identify instances where a particular participant verbally "@mentions" the user. For example, the particular participant may speak the phrase "At Carol@Contoso.com. We are going to discuss that thing in about 10 minutes" to notify Carol in real time of the upcoming activity even though she is not yet participating in the meeting.

In some examples, the content activity notification manager UI 300 may enable a user to set notification parameters 122 to trigger the notification 144 based on a progression of the conference session 104 with respect to a particular file. For example, the system 102 may process the media data 138 to identify when a currently shared portion of a data file (e.g., a portion of the file being shared by one or more participants) reaches and/or approaches a user specified portion of the data file. As another example, the system 102 may process the media data 138 to identify when a currently most viewed portion of a data file (e.g., a portion of the data file that is being displayed by a threshold number of the client devices 106) reaches and/or approaches a user specified portion of the data file.

In some examples, the content activity notification manager UI 300 may enable a user to set notification parameters 122 that indicate a particular user and/or group of users to trigger the notification 144 when particular activity occurs with respect to the particularly identified user and/or group of users. For example, as illustrated in FIG. 3A, notification parameters 122 are being set by the user to trigger the notification 144 whenever a particular user "Chris@Contoso.com" joins (e.g., begins to actively participate in) a particular type of meeting (e.g., any public meeting, any meeting having participants outside of and/or inside of a particular user group, and/or any other suitable type of meeting classification).

Figure 3B:
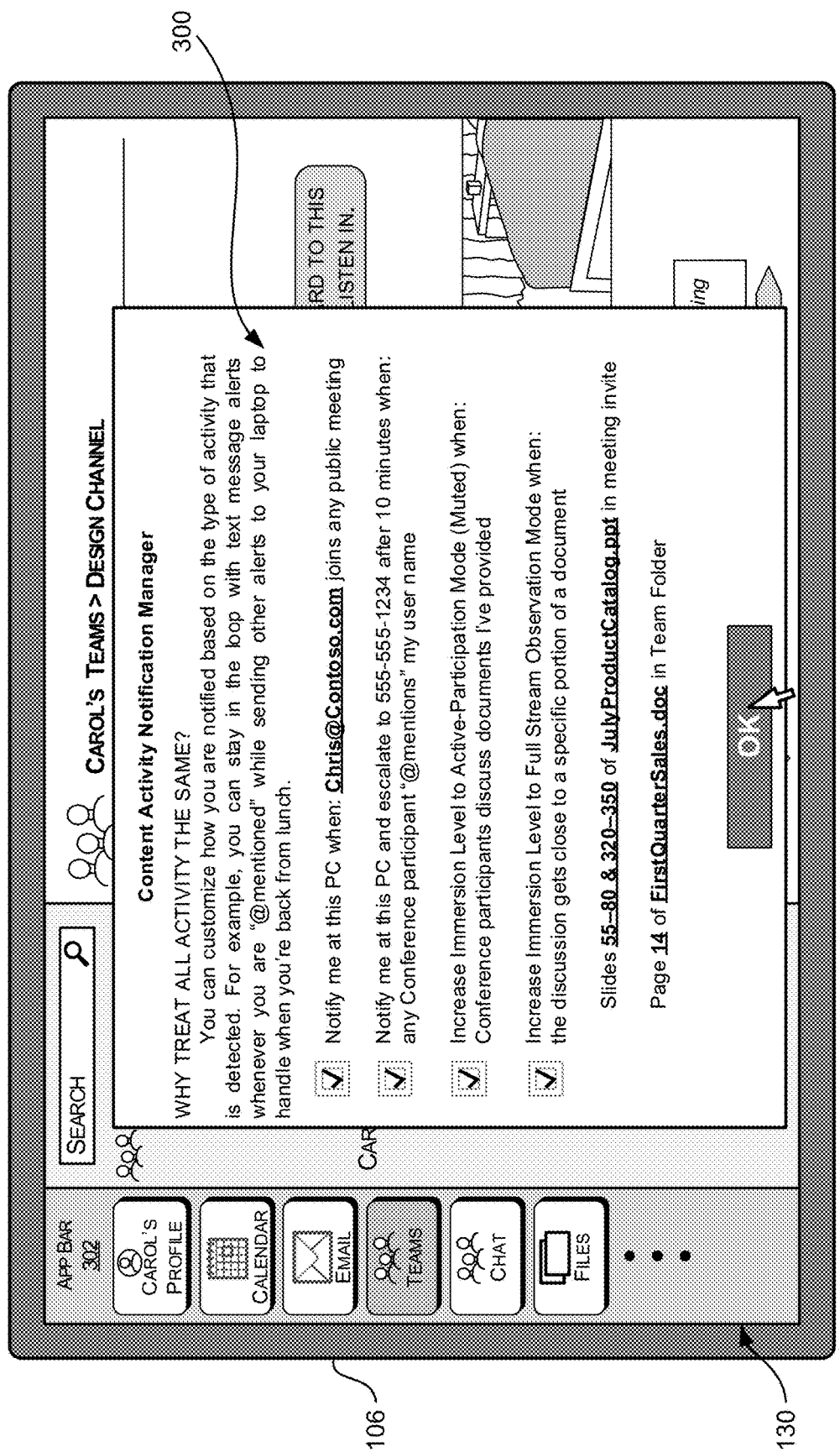

Turning now to FIG. 3B, in some implementations, the content activity notification manager UI 300 may also enable the user to specify particular types of notifications for particular types of notable events. In the illustrated example, the content activity notification manager UI 300 is informing the user that she can elect to be notified at various ones of her client devices (e.g., a personal computer corresponding to her user account, a mobile phone corresponding to a particular phone number, etc.) as she so chooses. Moreover, as further illustrated in FIG. 3B, the content activity notification manager UI 300 enables the user to set notification parameters 122 which cause the system 102 and/or the client device 106(1) to automatically adjust an immersion level in response to particular notable events.

In some embodiments, the system 102 may set notifications types according to a default notification type and further provide the user with an ability to deviate from the default by selecting between a plurality of other predefined notification types. For example, a drop-down window user interface element may be provided within the content activity notification manager UI 300 which displays the plurality of predefined notification types to the user in association with individual events defined by the notification parameters.

In some examples, the user may set notification parameters 122 to cause the system 102 to send the notification 144 to a single client device only such as, for example, client device 106(1). As illustrated, the user is requesting to be notified at her personal computer (e.g., a laptop computer corresponding to her user account) when the particular user "Chris@Contoso.com" joins any public meeting. In some embodiments, the system 102 may be configured to send multiple notifications to the single client device 106(1) in response to a single event. For example, the system 102 may transmit a first notification when the event is identified and then follow up with additional notifications until the user responds or otherwise acknowledges the notifications. In some embodiments, the multiple notifications that are sent to the single client device 106(1) may vary in type and/or urgency. For example, a first notification may be a "soft" notification such as, for example, a non-permanent pop up window that disappears automatically after a period of time. Then, a second notification may be a pop up window that requires user acknowledgement in order to be minimized to enable the user to resume working on her client device 106(1).

In some examples, the user may set notification parameters 122 to cause the system 102 to send the notification 144 to a first client device (e.g., a laptop computer corresponding to her user account) and also a second client device (e.g., a mobile phone). As illustrated, the user is requesting to be notified initially at her personal computer when any conference participant "@mentions" her user name. Then, in the event that the user does not receive the notification 144 at her personal computer within a specified time period (e.g., ten minutes), the user further requests to be notified at her mobile device (e.g., via text message and/or pop up notification on her smart phone). In various implementations, the system 102 may determine whether the user has received the notification 144 at the first client device based on factors such as whether the notification 144 is successfully transmitted to the first client device, or whether the user acknowledges receipt of the notification 144 (e.g., via selection of one or more UIEs), etc.

In some examples, the user may set notification parameters 122 to cause the system 102 to automatically set an immersion level to an active participation mode when a particular type of notable event occurs. As illustrated, the user is setting notification parameters 122 which automatically cause her client device 106(1) to operate in an active participation mode when conference participants begin to discuss documents that she has provided in association with the conference session 104. In some implementations, the user may further request that the notification 144 designates a type and/or amount of data to transmit in association with the active participation mode. For example, the user may set notification parameters 122 to prevent an audio and/or a video stream from being automatically initiated. In various implementations, such an active participation mode may correspond to the data flow scenario of FIG. 1E. As further illustrated, the user is further setting notification parameters 122 which automatically cause the client device 106(1) to operate in a full stream observation mode based on a progression of the conference session with respect to a particular file. In various implementations, such a full stream observation mode may correspond to the data flow scenario of FIG. 1D.

Figure 4A:
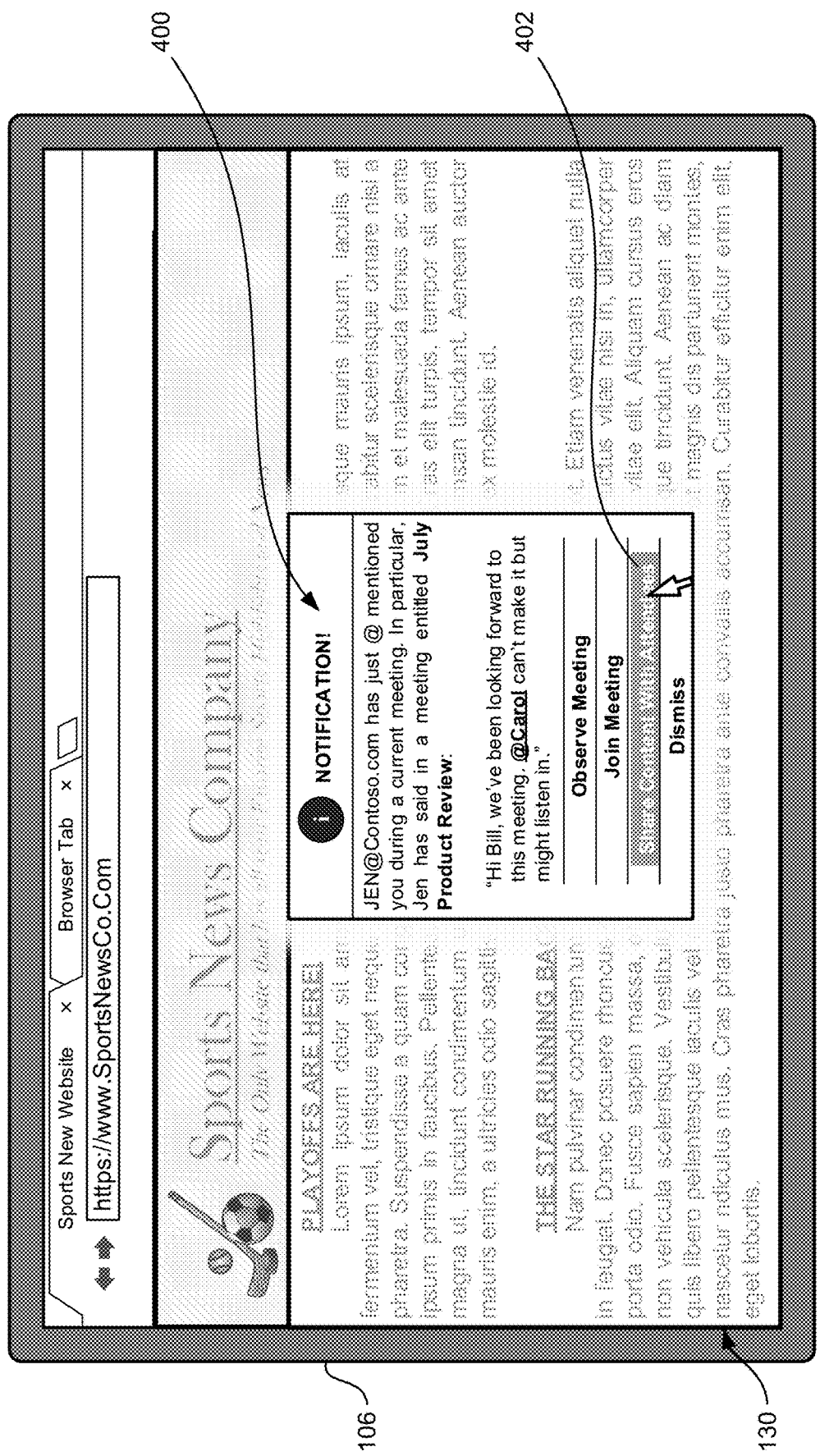
FIGS. 4A through 4E illustrate aspects of interfaces (UIs) that can be displayed on a client device in accordance with the techniques described herein.

FIG. 4A illustrates aspects of a notification UI 400 that can be displayed on a client device 106 to inform the user of a notable event. As illustrated, the notification UI 400 is informing the user that a particular participant (e.g., "JEN@Contoso.com") has just directed a comment to the user (e.g., via an "@mention") during a conference session 104 in which the user is neither actively participating nor observing. In various implementations, the notification UI 400 may be in the form of a pop-up type notification that is generated in a foreground of (e.g., superimposed over) one or more other applications being operated by the user. In the illustrated example, the user is operating in an application that is neither specifically associated with the conference session 104 nor system 102 (e.g., the user is browsing a sports website via a standard web browser). Consequently, it should be appreciated that the notification 144 may cause the notification UI 400 to be displayed on the client device 106 even when the user is not operating an application that is specifically configured to provision functionalities associated with the conference session 104. In various implementations, the notification UI 400 may include one or more UIEs to enable the user to select between one or more actions that can be taken with respect to the conference session 104. As illustrated, the user is selecting a particular UIE 402 to share content with the meeting attendees.

Figure 4B:
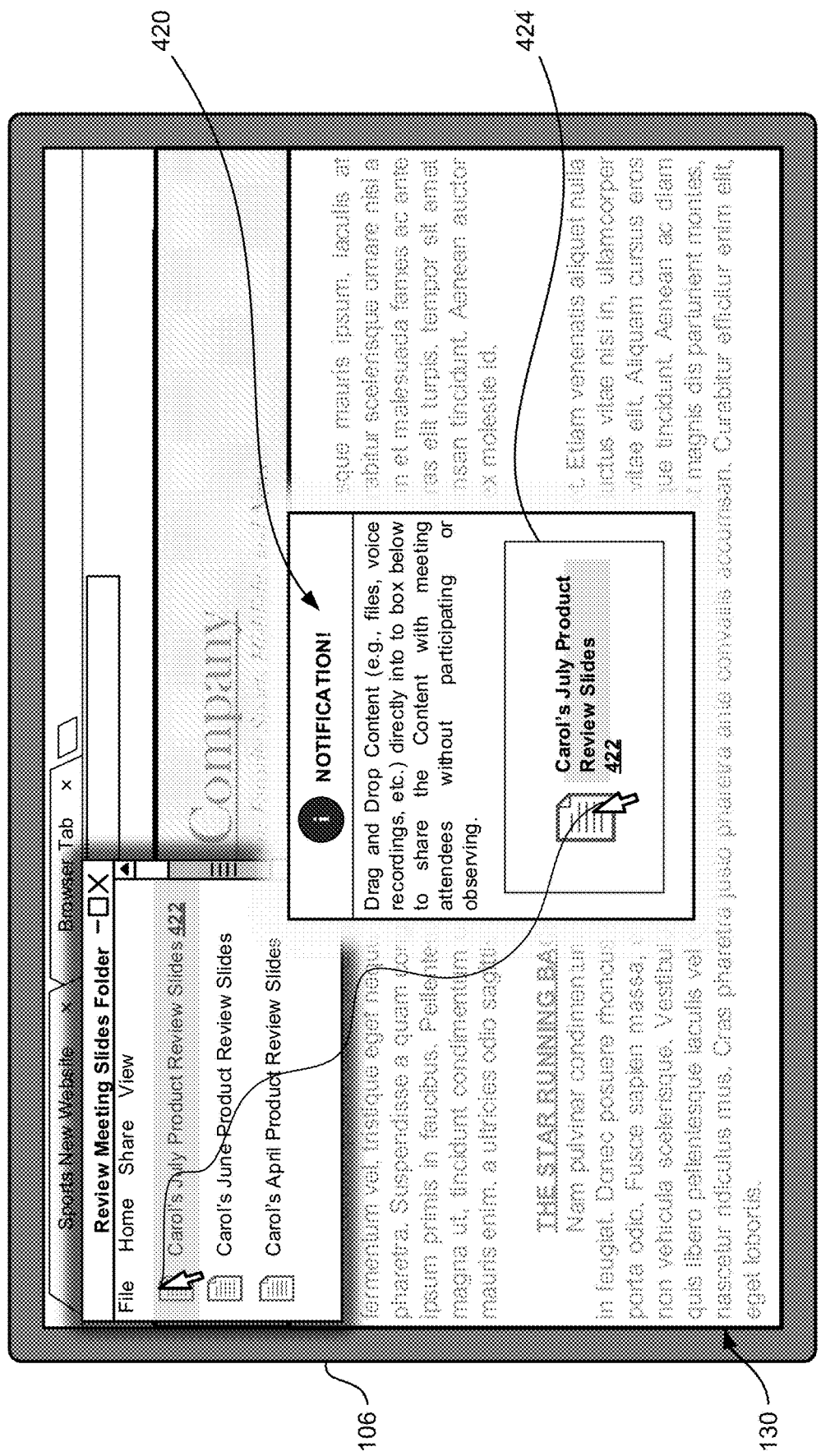

FIG. 4B illustrates aspects of a notification UI 420 that can be displayed in response to the user selecting the UIE 402 (shown in FIG. 4A) to enable the user to share content with participants and/or observers of the conference session 104. For example, in the illustrated scenario, the notification UI 420 informs the user that she can drag and drop content 422 into a share box 424 to cause the client device 106 to transmit the content 422 to other client devices associated with the conference session 104. As further illustrated, in some scenarios the user is enabled to share the content 422 into the conference session 104 without having to utilize any particular application that is specifically associated with the conference session 104 such as, for example, the application illustrated in FIG. 4C that the user is operating to participate in a different conference session with a particular user "Jason." It can be appreciated that the notification UI 420 shown in FIG. 4B may be generated to facilitate aspects of the data flow scenario illustrated in FIG. 1B.

Figure 4C:
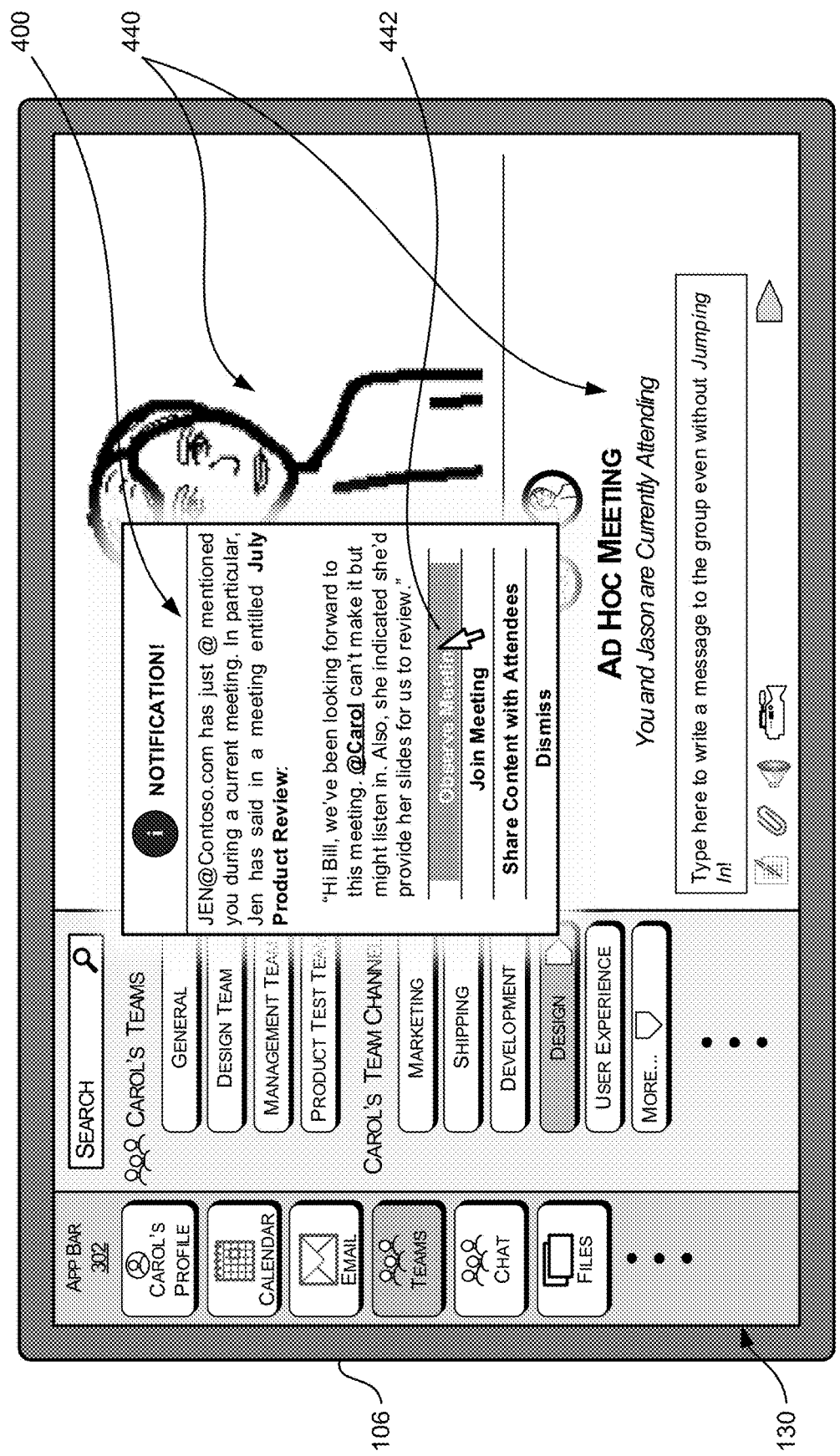

As illustrated in FIG. 4C, in some implementations the notification UI 400 can be superimposed over a user interface 440 that is associated with a different conference session that the user is observing and/or actively participating in. For purposes of the present discussion, the illustrated conference session taking place between the user and "Jason" is different in the sense that it is not the conference session 104 that the notification 144 corresponds to. In various implementations, the notification UI 400 may include a particular UIE 442 that enables the user to observe the conference session 104 (e.g., the conference session entitled "July Product Review"), and/or other UIEs to enable the user to actively participate in the conference session 104 (e.g., "Join" the meeting) and/or dismiss the notification 144.

Figure 4D:
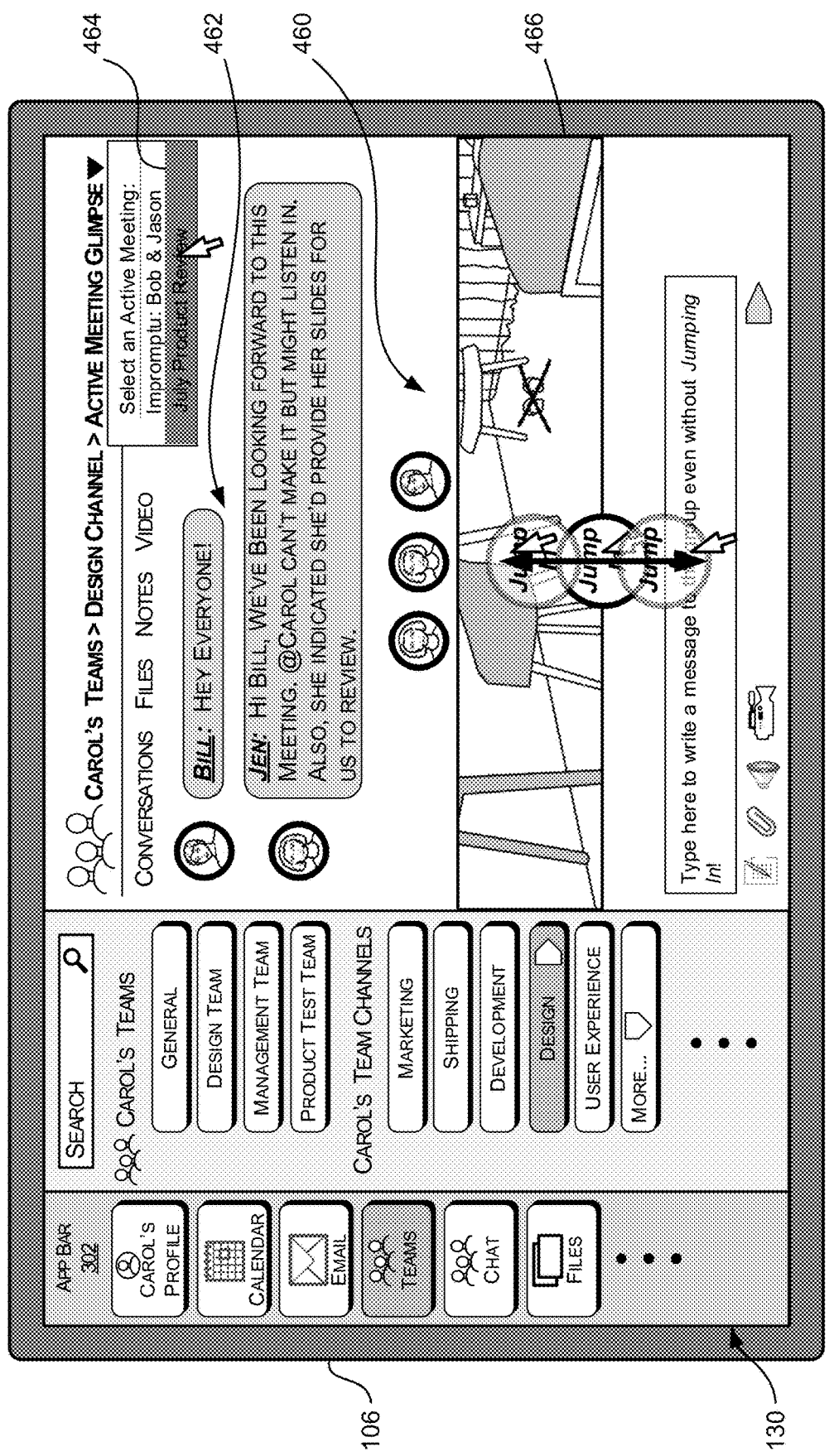

FIG. 4D illustrates aspects of notification that correspond to at least a conference observation UI 460 that can be displayed in response to the user selection of the UIE 442 to enable the user to observe the conference session 104 without actively participating in the conference session 104. For example, in the illustrated scenario the conference observation UI 460 displays a text-stream of participant contributions 462 to the conference session 104. As further illustrated, in some scenarios the conference observation UI 460 include a meeting selection UIE 464 to enable the user to select between a plurality of active meetings for observation of and/or participation in. It can be appreciated that the conference observation UI 460 shown in FIG. 4D may be generated to facilitate aspects of the data flow scenario illustrated in FIG. 1C.

In some implementations, the conference observation UI 460 may include an immersion level selection UIE 466 that enables the user to dynamically control a current immersion level with respect to the conference session 104. For example, the immersion level selection UIE 466 may be selectable and/or draggable by the user to dynamically and substantially immediately adjust an immersion level with respect to the conference session 104. In one example, the user may grab the immersion level selection UIE 466 by left clicking a mouse cursor and then subsequently drag the immersion level selection UIE 466 by moving her mouse up-and-down and/or left-and-right. For example, as the user drags the immersion level selection UIE 466, the UI 460 may be dynamically adjusted along an immersion scale.

Figure 4E:
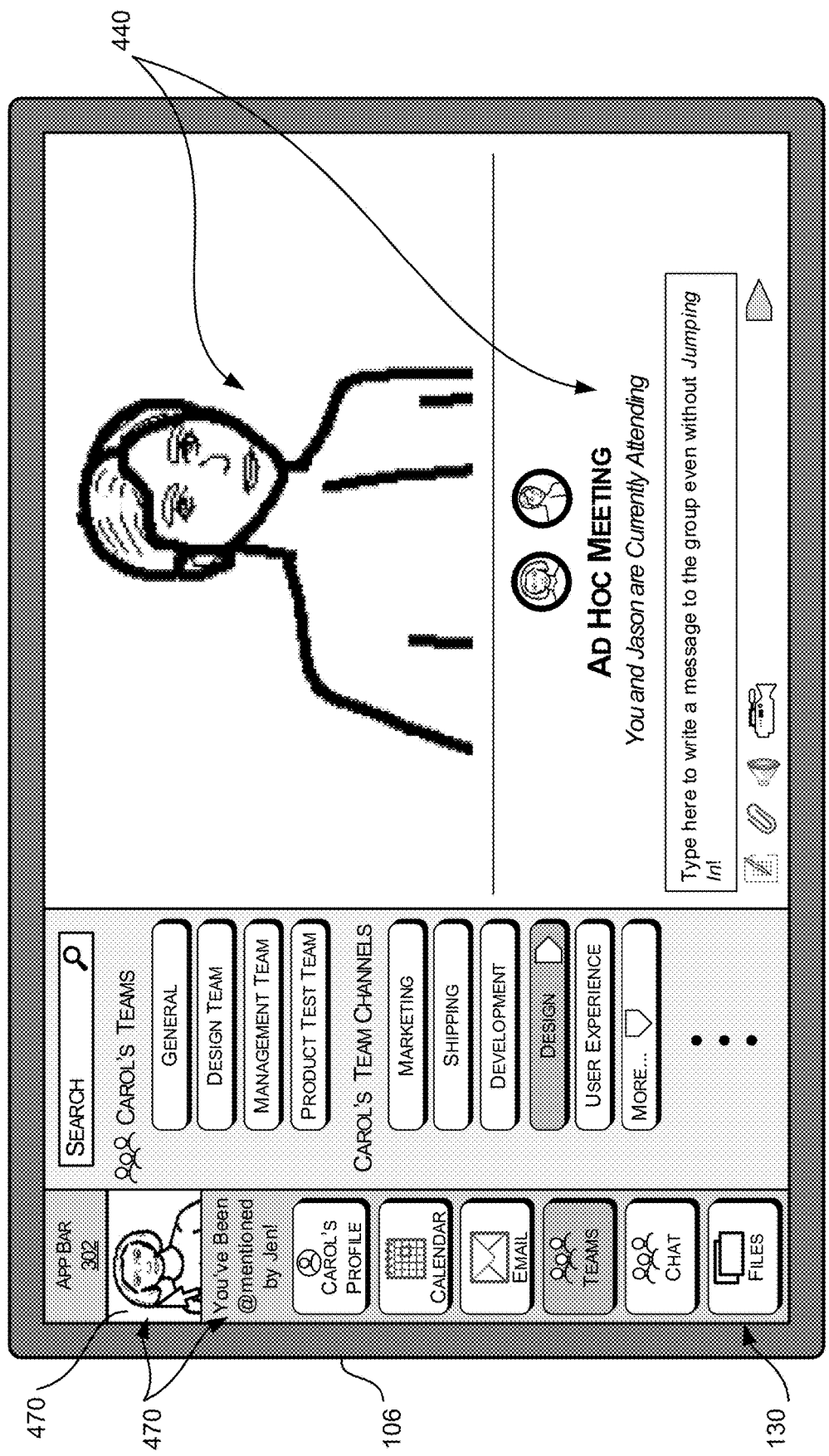

FIG. 4E illustrates aspects of an implementation in which a rich notification 470 is hoisted into the application bar 302 (e.g., displayed within and/or displacing some other elements of the application bar 302) to inform the user of activity occurring within the conference session 104 without interfering with the different conference session that the user is participating in. For example, in the illustrated scenario, rather than superimposing a notification over the user interface 440 as shown in FIG. 4C, the rich notification 470 can preview content (e.g. live streaming content) associated with the conference session 104 off to the side of the user interface 440, e.g. within the application bar 302.

In some implementations, the rich notification 470 may enable the user to observe and or join (the conference session 104 contemporaneously with the different conference session that she is participating in with Jason. For example, upon the rich notification 470 appearing within the app bar 302, the user may quickly jump in and then back out of the conference session 104 to address the @mention of her by Jen. As a specific but non-limiting example, the video portion (e.g. the upper portion showing the preview) of the rich notification 470 may be a user interface element that is selectable by the user to increase her immersion level with respect to the conference session 104. For example, a left-click on the preview with the user's mouse curser 472 may pause audio and/or video streams with respect to the different conference session and initiation audio and/or video streams with respect to the conference session 104 (e.g., the user may click the rich notification 470 and say "Hey Jen, I'm on a call with Jason but saw your @mention. What's up?"). Then, the user may release the click of the rich notification 470 and be immediately re-immersed into the different conference session with Jason.

Figure 5A:
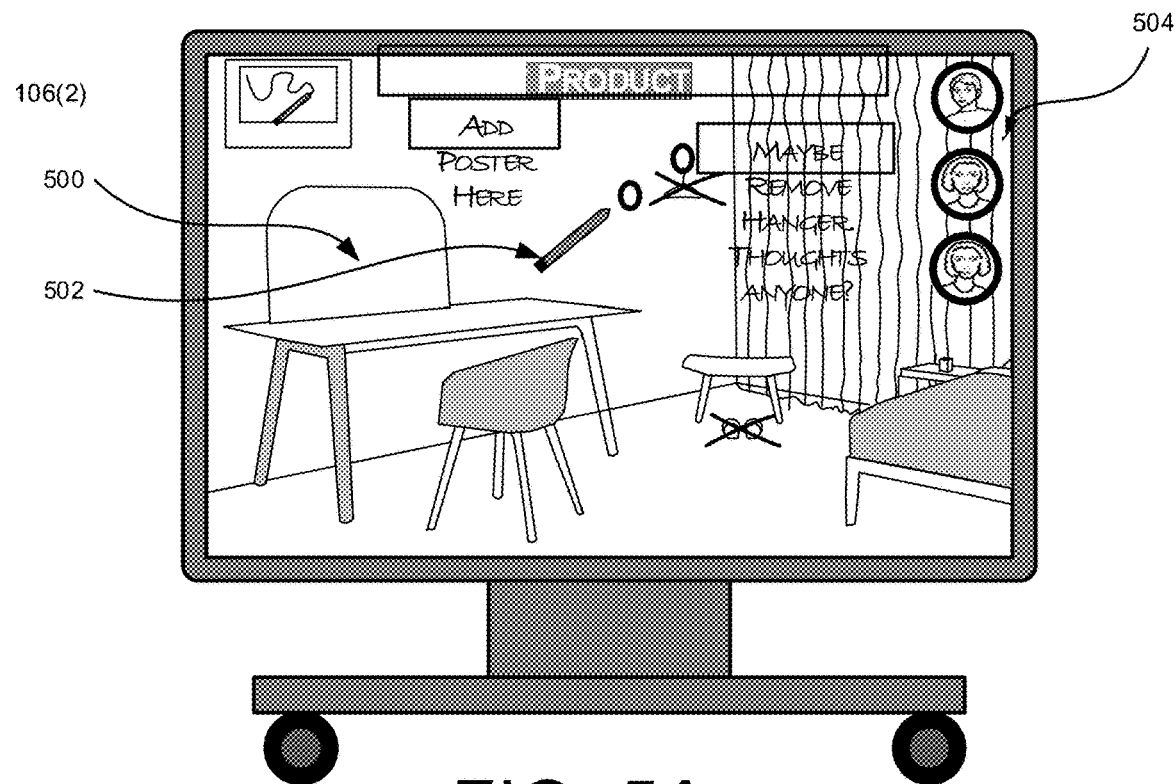
FIGS. 5A and 5B illustrate aspects of interfaces (UIs) that can be displayed on client devices based on one or more users of a particular user group initiating a conference session in accordance with techniques described herein.

FIG. 5A illustrates aspects of an active participation user interface 500 in which a plurality of users may actively participate in the conference session 104. As illustrated, the client device 106(2) is illustrated as a collaboration client device that is specifically configured to facilitate a digital collaborative working environment. As used herein, a "collaboration client device" generally refers to a client device that is substantially designed to facilitate collaborative teleconferencing sessions (e.g., SURFACE HUB by the MICROSOFT CORPORATION, of Redmond, Wash., dedicated multidirectional teleconferencing speaker phone stations, etc.) and/or a standard client device that has been designated (e.g., based on a unique identifier of the device) as a collaboration client device. The client device 106(2) is illustrated as a large touch enabled computing device that is specifically configured to enable users to write directly onto imagery rendered by a touch enabled display of the client device 106(2) using a stylus pen 502. In various implementations, the collaboration client device may further be configured to identify local users that are participating in the conference session 104 (e.g., by prompting users to login or otherwise identify themselves, by deploying facial recognition techniques from imagery that is obtained via one or more outward facing cameras, etc.). For example, the collaboration client device may identify local users and then render user representations listing 504 corresponding to each to indicate to remote participants of the conference session 104 whom is currently participating.

Figure 5B:
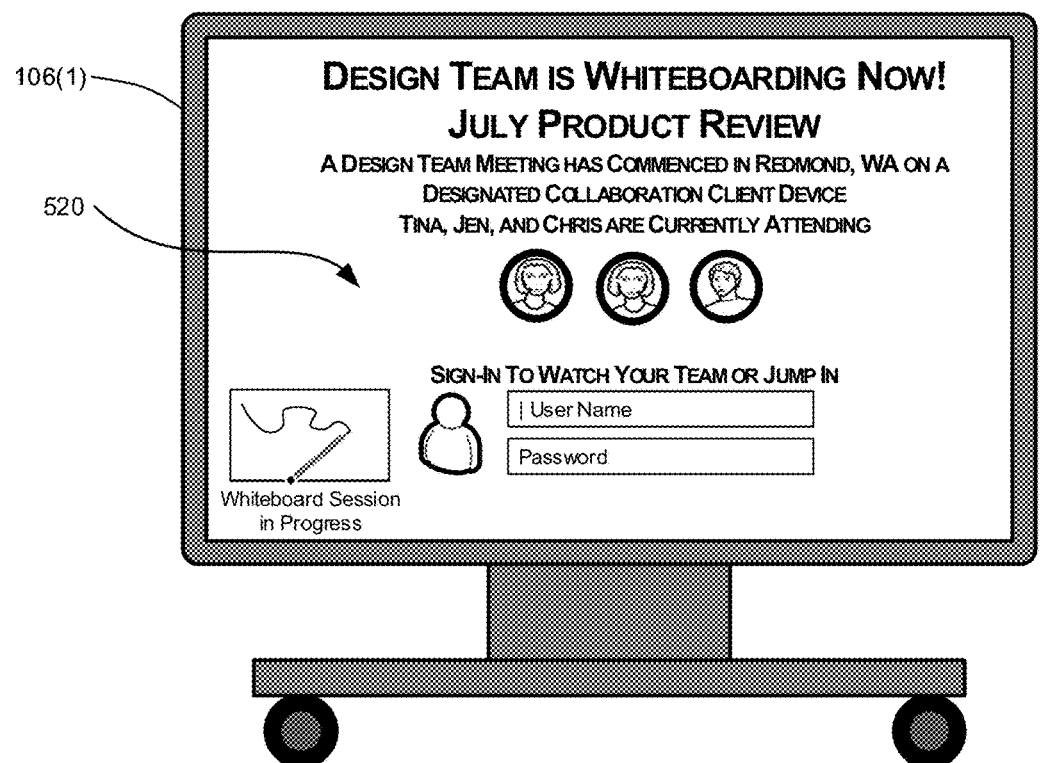

FIG. 5B illustrates aspects of a notification UI 520 that can be displayed at the client device 106(1) in response to the conference session 104 being initiated by one or more particular users and/or a particular user group. As illustrated, the notification UI 520 is informing the user that one or more members of a "Design Team" user group have initiated a public white boarding session. In some implementations, the notification UI 520 may prompt the user for user credentials as a prerequisite to permitting her to observe and/or actively participate in the conference session 104. Such an implementation may be beneficial when the client device 106(1) is a collaboration client device that is open for use by many users from many user groups across an organization (e.g., a SURFACE HUB device that is located in a lounge and/or cafeteria area of a business's campus). For example, the notification UI 520 may be rendered at the client device 106(1) to attract the attention of the user (if she is so present) and, ultimately, to afford her the option of observing and/or actively participating in the conference session 104. Requiring credentials of the user prior to broadcasting details of the conference session 104 may mitigate the risk of unauthorized disclosures (e.g., the conference session 104 being broadcast to a user and/or group of users that are not authorized to know details that will be discussed in the conference session 104).

Accordingly, it can be appreciated that in some instances the notification 144 is a notification of commencement of the conference session 104 (e.g., the purpose of the notification 144 is to inform the user that the conference session 104 has been initiated). In some instances, the notification of commencement may be generated in response to commencement of any conference session that is designated as public by an active participant (e.g., an active participant such as a meeting organizer may indicate to the system 102 that the conference session 104 is open to a particular group and/or class of users). Then, the system 102 may determine that the client device 106(1) is associated with a user that is permitted to join and/or observe the conference session 104 and, based thereon transmit the notification 144 to the client device 106(1).

In some implementations, the user may enter an observational mode while remaining inconspicuous to the active participants of the conference session 104. For example, merely beginning to observe the conference session 104 may result in the system 102 rendering a user representation of the user within the user representations listing 504 shown in FIG. 5A on the client device 106(2) that is operating in the active participation mode. Accordingly, in some implementations, the system 102 may identify a first set of users that are actively participating in the conference session 104 and a second set of users that are merely observing the conference session. Then, the system 102 may cause one or more devices to render a user representation listing 504 which includes identities of the first set of users but omits identities of the second set of users. Consequently, a user is enabled to toggle in and out of observational modes without distracting the active participants and/or other observers.

Figure 6:
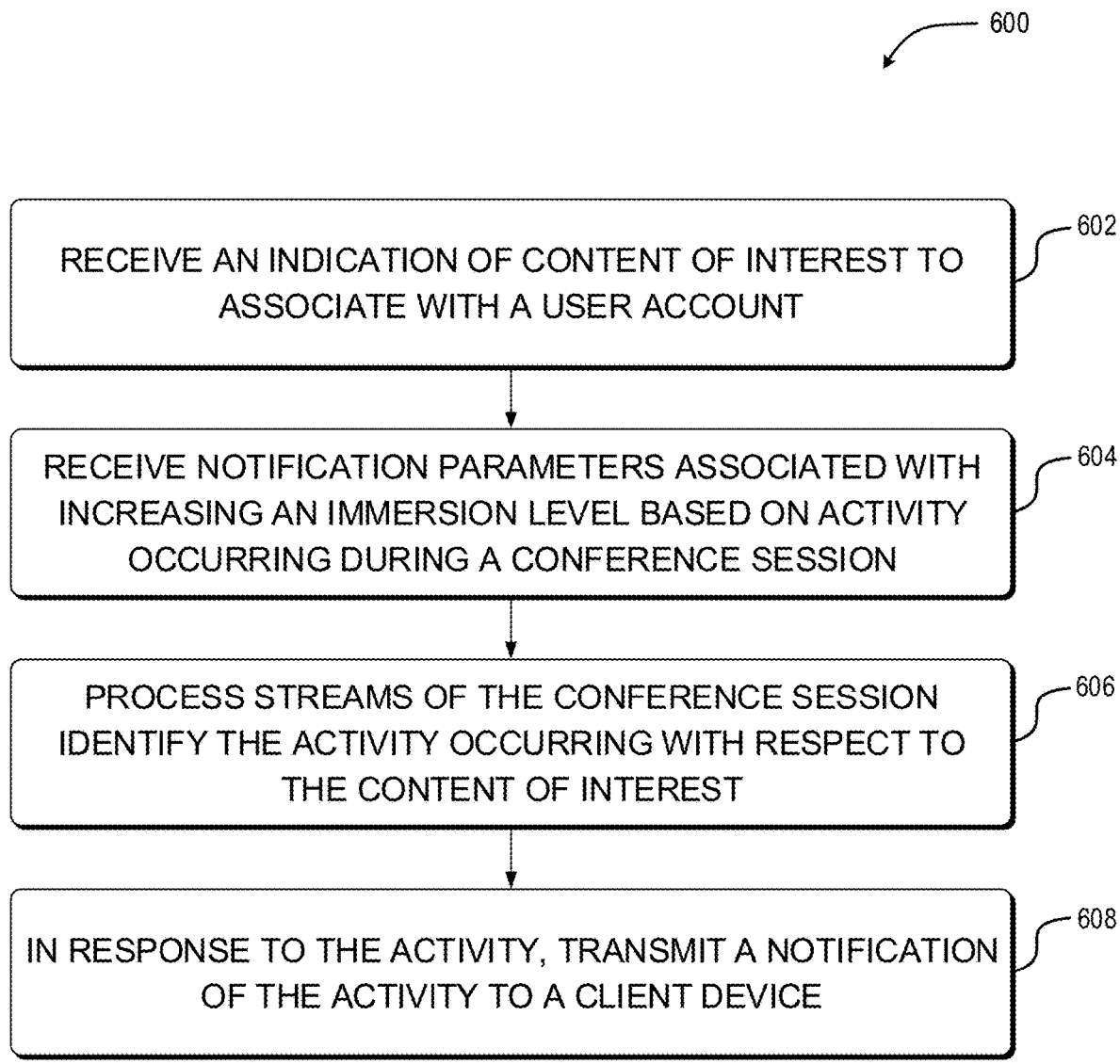
FIG. 6 is a flowchart illustrating an operation for monitoring a conference session to identify notable events and to transmit a notification of the notable events to a client device.

Turning now to FIG. 6, a flow diagram is illustrated of a process 600 for monitoring a conference session 104 to identify notable events 142 and to transmit a notification 144 of the notable events 142 to a client device 106(1). The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

At block 602, the system 102 may receive an indication of at least some content of interest to associate with a user account. The content of interest may include, for example, a particular data file and/or a specific portion of the particular data file, a particular user that the system 102 may identify based on a user ID, voice characteristic data that the system 102 may deploy to identify when a particular person speaks during a conference session 104 (e.g., a user may wish to be notified any time a business's CEO speaks in any conference session 104 that she is permitted to join and/or observe), facial characteristic data that the system 102 may deploy to identify when a particular person is present within the conference session (e.g., the system 102 may recognize several people in a room even when only a single person's computing device 106 is used to join the session).

At block 604, the system 102 may receive notification parameters 122 associated with increasing an immersion level, with respect to the conference session 104, based on activity occurring during the conference session 104 with respect to the content of interest indicated at block 602. The notification parameters 122 may indicate various activities that the system 102 is capable of identifying by analyzing the media data 138. In some implementations, the notification parameters 122 may indicate one or more priority levels to associate with different types of content of interest and/or activities that can be identified during the conference session 104. For example, referring back to FIG. 3B, the user may set a first priority level in association with the particular user "Chris@Contoso.com" joining public meetings while also setting a second priority level in association with conference participants "@mentioning" the user specifically during the conference session 104. Consequently, the system 102 can treat different types of activities occurring with respect to different types of content of interest with varying levels of urgency based on the notification parameters 122 that are specifically set by the user.

At block 606, the system 102 may process the media data (streams) corresponding to the conference session 104 to identify activity occurring with respect to the at least some content of interest. For example, the system 102 may identify an instance where a participant of the conference session 104 directs a statement to the user by, for example, sending an IM message that "@mentions" the user into the conference session 104. In some instances, the system 102 may monitor, for the user, multiple conference sessions (e.g., 104(1), 104(2), etc.) that are concurrently occurring and one or more sessions in which the user is not observing and/or participating. For example, the system 102 may simultaneously and/or concurrently process first conference data corresponding to a first conference session in addition to second conference data corresponding to a second conference session to identify one or more notable events that occur within each different conference session. Ultimately, that system 102 may inform the user as the notable events occur and/or are about to occur in each of the different conference sessions 104. Consequently, according to the techniques described herein a user may be empowered with the ability to efficiently switch her attention back and forth between two different conference sessions with minimal risk of missing notable events.

In some implementations, the conference session 104 may be an unscheduled conference session 104 (e.g., an impromptu conference session that the participants form extemporaneously rather than schedule in advance.) For example, one or more members of a particular user group that the user is also a member of may initiate the conference session 104 and be prompted to designate the conference session as either a public conference session (e.g., a conference session that is open to other members of the particular user group, a conference session that is open to any user regardless of their membership in the particular user group, etc.) or a private conference session (e.g., a conference session that is close to users other than those specifically invited). Then, based on whether the conference session 104 is designated as public or private, the system 102 may determine whether to transmit a notification of commencement to the user.

At block 608, the system 102 may transmit the notification 144 to the client device 106(1) in response to the activity identified at block 606. In various implementations, the notification 144 may include at least one UIE that is selectable to modify the immersion level of the user account with respect to the conference session 104. For example, as illustrated in FIGS. 4A through 4E, the notification 144 may correspond to various UI aspects associated with managing the immersion level such as, for example, UIEs to enable the user to observe the meeting, UIEs to enable the user to join the meeting, UIEs to enable the user to share content with the conference participants, and/or UIEs to simply dismiss the notification. In some implementations, the system 102 may select a notification type based on the one or more priority levels set in the notification parameters 122 at block 604. For example, depending on the type of activity and/or the type of content identified with respect to the notable events 142, the system 102 can transmit the notification 144 as a text message to a mobile phone, or as an email to a cloud-based email service which the user may check at her client device 106(1), as a pop up notification at her client device 106(1), or any other suitable type of notification that can be transmitted to any suitable type of client device.

Example Clauses

The disclosure presented herein may be considered in view of the following clauses.

Example Clause A, a system, comprising: one or more processing units; and a computer-readable medium having encoded thereon computer-executable instructions to cause the one or more processing units to: receive an indication of content of interest to associate with a user account; process conference data corresponding to one or more streams of a conference session to identify presence of activity associated with the content of interest; in response to identifying the activity associated with the content of interest, transmit a notification of the activity to a client device associated with the user account, wherein the notification includes at least one user interface element that is selectable to modify the immersion level of the user account with respect to the conference session; receive a control signal corresponding to activation of the at least one user interface element, the control signal indicating a selected immersion level that the user account is to have with respect to the conference session; and in response to the control signal, communicate conference data with the client device to provision the selected immersion level to the user account at the client device.

Example Clause B, the system of Example Clause A, wherein the computer-executable instructions further cause the one or more processing units to: determine a priority level associated with the activity occurring during the conference session; and select, based on the priority level, a notification type from a plurality of notification types, wherein the notification is generated in accordance with the notification type.

Example Clause C, the system of any one of Example Clauses A through B, wherein the computer-executable instructions further cause the one or more processing units to process second conference data corresponding to one or more second streams of a second conference session to identify presence the activity associated with the content of interest within the second conference session, and wherein the second conference session occurs at least partially concurrently with the conference session.

Example Clause D, the system of any one of Example Clauses A through C, wherein the immersion level is configured to designate at least one of a plurality of immersion modes including at least one of a first observational mode associated with rendering at least a text-stream of participant contributions, a second observational mode associated with rendering a live unidirectional video-stream of the conference session, or an active-participation mode associated with bi-directional streaming of at least one of audio content or video content.

Example Clause E, the system of any one of Example Clauses A through D, wherein the conference session is an unscheduled conference session that is designated as a public conference session.

While Example Clauses A through E are described above with respect to a system, it is understood in the context of this document that the subject matter of Example Clauses A through E can also be implemented by a device, via a computer-implemented method, and/or via computer-readable storage media.

Example Clause F, a system comprising: one or more processing units; and a computer-readable medium having encoded thereon computer-executable instructions to cause the one or more processing units to: receive a selection of at least some content of interest to associate with a user account; receive, from at least one first client device, one or more streams associated with a conference session, wherein the at least one first client device is operating in an active-participation mode with respect to the conference session; determine, based on the one or more streams, an indication of activity occurring with respect to the at least some content of interest during the conference session; process the one or more streams to generate conference data that includes one or more transcribed speech instances corresponding to the conference session; in response to the indication, cause a display, of a second client device that corresponds to the user account, to render at least one user interface element that is selectable to cause the second client device to switch between at least a first immersion level and a second immersion level, wherein the first immersion level corresponds to a first observational mode for rendering, within at least one display area, the one or more transcribed speech instances as a text-stream of participant contributions.

Example Clause G, the system of Example Clause F, wherein the second immersion level corresponds to a second observational mode associated with at least one of playing a live unidirectional audio-stream of the conference session or rendering a live unidirectional video-stream of the conference session, and wherein the active-participation mode corresponds to a third immersion level that includes bi-directional streaming with respect to the conference session.

Example Clause H, the system of any one of Example Clauses F through G, wherein the at least one user interface element is further selectable to cause the second client device to operate in the active-participation mode by initiating the bi-directional streaming with respect to the conference session.

Example Clause I, the system of any one of Example Clauses F through H, wherein the computer-executable instructions further cause the one or more processing units to: receive, from the second client device, a request to associate a data file with the conference session, wherein the request is received concurrently with the second client device which is operating in at least one of an observational mode or a non-immersive mode; and provide, based on the request, the at least one first client device with access to the data file to enable at least one active participant of the conference session to manipulate the data file in association with the one or more streams.

Example Clause J, the system of any one of Example Clauses F through I, wherein the selection of the at least some content of interest corresponds to at least one of: a data file that is shared during the conference session; a sub-portion of the data file that is shared during the conference session; a user name associated with the user account; or a user group associated with the user account.

Example Clause K, the system of any one of Example Clauses F through J, wherein causing the display to render the at least one user interface element is further based on the conference session being designated as a public conference session.

Example Clause L, the system of any one of Example Clauses F through K, wherein the computer-executable instructions further cause the one or more processing units to: determine whether the at least one first client device includes a collaboration client device; and in response to the at least one first client device including the collaboration device, prompt at least one active participant of the conference session to designate the conference session as being either a private conference session or the public conference session.

Example Clause M, the system of any one of Example Clauses F through L, wherein a graphical user interface (GUI) arrangement that is displayed on the at least one first client device that is operating in the active-participation mode includes at least one listing of conference attendees, and wherein the listing of conference attendees: includes first user identities indicating a first set of users associated with the active-participation mode, and omits second user identities indicating a second set of users associated with at least one of the first observational mode or the second observational mode.

While Example Clauses F through M are described above with respect to a system, it is understood in the context of this document that the subject matter of Example Clauses F through M can also be implemented by a device, via a computer-implemented method, and/or via computer-readable storage media.

Example Clause N, a computer-implemented method, comprising: generating a request associated with increasing an immersion level, with respect to a conference session, based on activity occurring with respect to at least some content of interest during the conference session, wherein the immersion level is associated with a plurality of immersion modes; receiving, at a client device, conference data corresponding to one or more streams of a conference session; receiving, concurrently with the client device operating in a first immersion mode, an indication of the activity occurring with respect to the at least some content of interest; and causing, in response to the indication, the immersion level to increase from the first immersion mode to a second immersion mode, wherein the second immersion mode corresponds to at least one of: a notification mode associated with generating at least one notification of the activity occurring with respect to the at least some content of interest; a first observational mode associated with rendering at least a text-stream of participant contributions; a second observational mode associated with rendering a live unidirectional video-stream of the conference session; or an active-participation mode associated with bi-directional streaming of at least one of audio content or video content.

Example Clause O, the computer-implemented method of Example Clause N, wherein the at least one notification includes at least one user interface element that is selectable to further increase the immersion level to at least one of the first observational mode, the second observational mode, or the active-participation mode.

Example Clause P, the computer-implemented method of any one of Example Clauses N through O, wherein the at least some content of interest corresponds to a user selection of a sub-portion of a data file that is associated with the conference session.

Example Clause Q, the computer-implemented method of any one of Example Clauses N through P, wherein the live unidirectional video-stream corresponds to a salient portion of a data file that is associated with the conference session.

Example Clause R, the computer-implemented method of any one of Example Clauses N through Q, wherein a particular portion of the data file is determined to be the salient portion based on at least one of: the particular portion being actively edited by an active participant of the conference session; the particular portion being actively viewed by a threshold level of active participants; or the particular portion being actively shared by a predetermined active participant.

Example Clause S, the computer-implemented method of any one of Example Clauses N through R, wherein the at least one notification is a notification of commencement of the conference session, and wherein the notification of commencement is generated based on the conference session being designated as being a public conference session, and the client device corresponding to a particular user account.

Example Clause T, the computer-implemented method of any one of Example Clauses N through S, wherein the at least one notification is a notification of commencement of the conference session, and wherein the notification of commencement is generated based on the one or more streams originating from at least one public collaboration client device.

While Example Clauses N through T are described above with respect to a method, it is understood in the context of this document that the subject matter of Example Clauses N through T can also be implemented by a device, by a system, and/or via computer-readable storage media.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system, comprising:
one or more processing units; and
a computer-readable medium having encoded thereon computer-executable instructions to cause the one or more processing units to:
receive an indication of content of interest to associate with a user account;
process conference data corresponding to one or more streams of a conference session to:
generate transcribed speech instances corresponding to the conference session, and
identify activity occurring during the conference session with respect to the content of interest;
in response to identifying the activity occurring during the conference session with respect to the content of interest, transmit a notification of the activity to a client device that is associated with the user account and that is rendering the transcribed speech instances as a text-stream of participant contributions during the conference session in accordance with a first immersion level, wherein the participant contributions correspond to at least one of: audibly spoken words of participants of the conference session, or written messages that are transmitted by the participants of the conference session, and wherein the notification causes the client device to render at least one user interface element that is selectable to switch the client device between at least the first immersion level and a second immersion level with respect to the conference session;

receive a control signal corresponding to activation of the at least one user interface element, the control signal indicating a selection of the second immersion level; and in response to the control signal, cause the client device to play at least one of a live audio-stream or a live video-stream of the conference session in accordance with the second immersion level.

2. The system of claim 1, wherein the computer-executable instructions further cause the one or more processing units to:

determine a priority level associated with the activity occurring during the conference session; and select, based on the priority level, a notification type from a plurality of notification types, wherein the notification is generated in accordance with the notification type.

3. The system of claim 1, wherein the computer-executable instructions further cause the one or more processing units to process second conference data corresponding to one or more second streams of a second conference session to identify presence of the activity associated with the content of interest within the second conference session, and wherein the second conference session occurs at least partially concurrently with the conference session.

4. The system of claim 1, wherein the second immersion level corresponds to:

an observational mode associated with rendering a live unidirectional video-stream of the conference session, or an active-participation mode associated with bi-directional streaming of at least one of audio content or video content.

5. The system of claim 1, wherein the conference session is an unscheduled conference session that is designated as a public conference session.

6. A system comprising:

one or more processing units; and a computer-readable medium having encoded thereon computer-executable instructions to cause the one or more processing units to:

receive a selection of at least some content of interest to associate with a user account;

receive, from at least one first client device, one or more streams associated with a conference session, wherein the at least one first client device is operating in an active-participation mode during which the at least one first client device performs bidirectional streaming with respect to the conference session;

process the one or more streams to generate conference data that includes transcribed speech instances corresponding to the conference session;

based on the conference data, cause a display of a second client device, that corresponds to the user account, to render the transcribed speech instances as a text-stream of participant contributions during the conference session in accordance with a first immersion level, wherein the participant contributions correspond to at least one of:

audibly spoken words of participants of the conference session, or written messages that are transmitted by the participants of the conference session;

determine, based on the one or more streams, an indication of activity occurring with respect to the at least some content of interest during the conference session;

in response to the indication and while the second client device is rendering the transcribed speech instances as the text-stream of participant contributions during the conference session in accordance with the first immersion level, cause the display, of the second client device that corresponds to the user account, to render at least one immersion level selection user interface element that is selectable to cause the second client device to switch between at least the first immersion level and a second immersion level;

in response to a selection of the at least one immersion level selection user interface element, cause the second client device to play at least one of a live audio-stream or a live video-stream of the conference session in accordance with the second immersion level.

7. The system of claim 6, wherein the second immersion level corresponds to an observational mode associated with at least one of playing a live unidirectional audio-stream of the conference session or rendering a live unidirectional video-stream of the conference session.

8. The system of claim 7, wherein the at least one immersion level selection user interface element is further selectable to cause the second client device to operate in the active-participation mode by initiating bi-directional streaming with respect to the conference session.

9. The system of claim 7, wherein the computer-executable instructions further cause the one or more processing units to:

receive, from the second client device, a request to associate a data file with the conference session, wherein the request is received concurrently with the second client device operating in at least one of an observational mode or a non-immersive mode; and provide, based on the request, the at least one first client device with access to the data file to enable at least one active participant of the conference session to manipulate the data file in association with the one or more streams.

10. The system of claim 6, wherein the selection of the at least some content of interest corresponds to at least one of: a data file that is shared during the conference session; a sub-portion of the data file that is shared during the conference session; a user name associated with the user account; or a user group associated with the user account.

11. The system of claim 6, wherein causing the display to render the at least one immersion level selection user interface element is further based on the conference session being designated as a public conference session.

12. The system of claim 11, wherein the computer-executable instructions further cause the one or more processing units to:

determine whether the at least one first client device includes a collaboration client device; and in response to the at least one first client device including the collaboration client device, prompt at least one active participant of the conference session to designate the conference session as being either a private conference session or the public conference session.

13. The system of claim 6, wherein a graphical user interface (GUI) arrangement that is displayed on the at least one first client device that is operating in the active-participation mode includes a listing of conference attendees, and wherein the listing of conference attendees:
  includes first user identities indicating a first set of users associated with the active-participation mode, and
  omits second user identities indicating a second set of users associated with an observational mode.

14. A computer-implemented method, comprising:
  generating a request associated with increasing an immersion level, with respect to a conference session, based on activity occurring with respect to at least some content of interest during the conference session, wherein the immersion level is associated with a plurality of immersion modes;
  receiving, at a client device, conference data corresponding to one or more streams of the conference session;
  receiving, concurrently with the client device operating in an observational mode, an indication of the activity occurring with respect to the at least some content of interest, wherein the observational mode corresponds to at least one of:
    rendering, at a display of the client device, a text-stream of participant contributions, or
    rendering, at the display of the client device, a live unidirectional video-stream of the conference session; and
  causing, in response to the indication, the immersion level to increase from the observational mode to
    an active-participation mode associated with bi-directional streaming of at least one of audio content or video content.

15. The computer-implemented method of claim 14, further comprising causing the display of the client device to render at least one user interface element that is selectable to further increase the immersion level from the observational mode to the active-participation mode.

16. The computer-implemented method of claim 14, wherein the at least some content of interest corresponds to a user selection of a sub-portion of a data file that is associated with the conference session.

17. The computer-implemented method of claim 14, wherein the live unidirectional video-stream corresponds to a salient portion of a data file that is associated with the conference session.

18. The computer-implemented method of claim 17, wherein a particular portion of the data file is determined to be the salient portion based on at least one of: the particular portion being actively edited by an active participant of the conference session; the particular portion being actively viewed by a threshold level of active participants; or the particular portion being actively shared by a predetermined active participant.

19. The computer-implemented method of claim 14, further comprising causing the display of the client device to render a notification of commencement of the conference session, and wherein the notification of commencement is generated based on the conference session being designated as being a public conference session, and the client device corresponding to a particular user account.

20. The computer-implemented method of claim 14, further comprising causing the display of the client device to render a notification of commencement of the conference session, and wherein the notification of commencement is generated based on the one or more streams originating from at least one public collaboration client device.

* * * * *